(12) United States Patent
Okamoto et al.

(10) Patent No.: US 10,723,288 B2
(45) Date of Patent: Jul. 28, 2020

(54) WIRING STRUCTURE FOR IN-WHEEL MOTOR POWER LINE, AND IN-WHEEL MOTOR DRIVE DEVICE

(71) Applicant: NTN CORPORATION, Osaka (JP)

(72) Inventors: Shogo Okamoto, Shizuoka (JP); Shiro Tamura, Shizuoka (JP); Minoru Suzuki, Shizuoka (JP); Yusuke Shibuya, Shizuoka (JP); Shinya Taikou, Shizuoka (JP)

(73) Assignee: NTN CORPORATION, Osaka (JP)

( * ) Notice: Subject to any disclaimer, the term of this patent is extended or adjusted under 35 U.S.C. 154(b) by 27 days.

(21) Appl. No.: 16/090,598

(22) PCT Filed: Sep. 29, 2016

(86) PCT No.: PCT/JP2016/078828
§ 371 (c)(1),
(2) Date: Oct. 2, 2018

(87) PCT Pub. No.: WO2017/175409
PCT Pub. Date: Oct. 12, 2017

(65) Prior Publication Data
US 2019/0077342 A1 Mar. 14, 2019

(30) Foreign Application Priority Data

Apr. 6, 2016 (JP) .................................. 2016-076349
Sep. 23, 2016 (JP) .................................. 2016-185133

(51) Int. Cl.
*B60K 7/00* (2006.01)
*B60R 16/02* (2006.01)
(Continued)

(52) U.S. Cl.
CPC ............ *B60R 16/0207* (2013.01); *B60G 3/20* (2013.01); *B60K 7/00* (2013.01); *B60K 7/0007* (2013.01);
(Continued)

(58) Field of Classification Search
CPC .. B60K 7/0007; B60K 7/0038; B60K 7/0069; B60L 2220/44; B60L 2220/46
(Continued)

(56) References Cited

U.S. PATENT DOCUMENTS 3,566,165 A * 2/1971 Lohr .................... B60K 7/0007
310/67 R
4,913,258 A * 4/1990 Sakurai ................ B60K 7/0007
180/242

(Continued)

FOREIGN PATENT DOCUMENTS

JP 2006-240430 9/2006
JP 2010-087261 4/2010
(Continued)

*Primary Examiner* — Jeffrey J Restifo
(74) *Attorney, Agent, or Firm* — Clark & Brody LP

(57) ABSTRACT

An in-wheel motor power line (93) includes, between its one end and the other end, an in-wheel motor drive device-side region (93d), an intermediate region (93e), and a vehicle body-side region (93f) which extend continuously. The in-wheel motor drive device-side region (93d) extends in the vertical direction, and the lower side of the in-wheel motor drive device-side region is connected to the intermediate region. The vehicle body-side region extends in the vertical direction, and the lower side of the vehicle body-side region is connected to the intermediate region. The intermediate region is curved with its both sides located at a higher position and its intermediate part located at a lower position.

11 Claims, 14 Drawing Sheets

(51) Int. Cl.
  *B60K 17/04* (2006.01)
  *B60G 3/20* (2006.01)
  *B60R 16/023* (2006.01)
  *B60R 16/03* (2006.01)

(52) U.S. Cl.
  CPC ........ *B60K 17/043* (2013.01); *B60R 16/0239* (2013.01); *B60R 16/03* (2013.01); *B60K 2007/0038* (2013.01); *B60K 2007/0061* (2013.01); *B60L 2220/44* (2013.01); *B60L 2220/46* (2013.01)

(58) Field of Classification Search
  USPC ...................................................... 180/65.51
  See application file for complete search history.

(56) References Cited

U.S. PATENT DOCUMENTS

| | | | | |
|---|---|---|---|---|
| 5,087,229 | A * | 2/1992 | Hewko | B60K 7/0007 180/65.51 |
| 5,127,485 | A * | 7/1992 | Wakuta | B60K 7/0007 180/65.51 |
| 5,150,763 | A * | 9/1992 | Yamashita | B60K 7/0007 180/242 |
| 5,581,136 | A * | 12/1996 | Li | B62M 6/45 310/67 R |
| 6,286,616 | B1 * | 9/2001 | Kutter | B62M 6/40 180/206.5 |
| 6,321,863 | B1 * | 11/2001 | Vanjani | B60K 7/0007 180/65.51 |
| 7,597,169 | B2 * | 10/2009 | Borroni-Bird | B60G 3/18 180/253 |
| 7,653,987 | B2 * | 2/2010 | Tokuda | B60R 16/0215 29/760 |
| 7,870,917 | B2 * | 1/2011 | Akagi | A61G 5/045 180/65.1 |
| 8,020,653 | B2 * | 9/2011 | Mizutani | B60K 7/0007 180/65.51 |
| 8,104,557 | B2 * | 1/2012 | Takahashi | B60L 8/006 180/65.51 |
| 8,360,188 | B2 * | 1/2013 | Yonehana | B62K 25/005 180/220 |
| 8,459,386 | B2 * | 6/2013 | Pickholz | B60K 7/0007 180/65.31 |
| 10,059,162 | B2 * | 8/2018 | Matayoshi | B60K 1/00 |
| 10,150,359 | B2 * | 12/2018 | Tamura | B60K 7/0007 |
| 10,464,384 | B2 * | 11/2019 | Ishikawa | B60K 17/043 |
| 10,479,207 | B2 * | 11/2019 | Nakayama | B60K 7/00 |
| 2006/0219449 | A1 * | 10/2006 | Mizutani | F16H 57/0457 180/65.51 |
| 2007/0234559 | A1 * | 10/2007 | Tokuda | B60K 7/0007 29/755 |
| 2008/0093133 | A1 * | 4/2008 | Yogo | B60G 3/20 180/55 |
| 2008/0257620 | A1 * | 10/2008 | Poulsen | B60K 6/26 180/65.51 |
| 2009/0166111 | A1 * | 7/2009 | Mizutani | B60K 7/0007 180/65.51 |
| 2010/0163323 | A1 * | 7/2010 | Pickholz | B60K 7/0007 180/65.51 |
| 2010/0320852 | A1 * | 12/2010 | Isogai | H02K 5/225 310/71 |
| 2010/0320853 | A1 * | 12/2010 | Isogai | H02K 5/225 310/71 |
| 2011/0180336 | A1 * | 7/2011 | Kurata | B60L 53/22 180/65.1 |
| 2014/0190741 | A1 * | 7/2014 | Hayakawa | B60R 16/0207 174/72 A |
| 2015/0061440 | A1 * | 3/2015 | Catalan | H02K 7/08 310/154.01 |
| 2016/0149357 | A1 * | 5/2016 | Matayoshi | H01R 13/73 439/34 |
| 2016/0176369 | A1 * | 6/2016 | Ito | H01B 11/04 174/72 A |
| 2017/0190229 | A1 * | 7/2017 | Matayoshi | B60K 7/00 |
| 2017/0369007 | A1 * | 12/2017 | Tamura | B60R 16/02 |
| 2018/0215271 | A1 * | 8/2018 | Nakayama | B60K 7/0007 |

FOREIGN PATENT DOCUMENTS

| | | |
|---|---|---|
| JP | 4628136 | 2/2011 |
| JP | 2013-147084 | 8/2013 |
| JP | 2013-159224 | 8/2013 |
| JP | 2014-189107 | 10/2014 |
| JP | 2014-193715 | 10/2014 |
| JP | 2016-001041 | 1/2016 |
| JP | 2016-032962 | 3/2016 |
| JP | 2016-041581 | 3/2016 |
| WO | 2015/129379 | 9/2015 |
| WO | 2015/198679 | 12/2015 |

* cited by examiner

FRONT OF VEHICLE

OUTSIDE IN LATERAL DIRECTION OF VEHICLE
←

OUTSIDE IN LATERAL DIRECTION OF VEHICLE
←

OUTSIDE IN LATERAL DIRECTION OF VEHICLE

OUTSIDE IN LATERAL DIRECTION OF VEHICLE

OUTSIDE IN LATERAL DIRECTION OF VEHICLE

FRONT OF VEHICLE

FRONT OF VEHICLE

OUTSIDE IN LATERAL DIRECTION OF VEHICLE

OUTSIDE IN LATERAL DIRECTION OF VEHICLE

WIRING STRUCTURE FOR IN-WHEEL MOTOR POWER LINE, AND IN-WHEEL MOTOR DRIVE DEVICE

TECHNICAL FIELD

The present invention relates to power lines that extend from an in-wheel motor drive device to a vehicle body to supply electric power from the vehicle body to the in-wheel motor drive device.

BACKGROUND ART

A technique of mounting an in-wheel motor inside a wheel of an electric vehicle to drive the wheel by the in-wheel motor is conventionally known in the art. In such electric vehicles, it is not necessary to mount an engine and a motor on a vehicle body, which is advantageous in that the vehicle body can have larger internal space such as passenger space and cargo space. The in-wheel motor is coupled to the vehicle body of the electric vehicle via a suspension device. A control unit, a battery, and an inverter for the in-wheel motor are mounted on the vehicle body. The in-wheel motor coupled to an unsprung part (the wheel side) of the suspension device and the inverter mounted on a sprung part (the vehicle body side) of the suspension device are connected by power lines. For example, power lines as described in Japanese Patent No. 4,628,136 (Patent Literature 1) and Japanese Unexamined Patent Application Publication No. 2006-240430 (Patent Literature 2) are conventionally known as power lines that supply electric power from the inverter to the in-wheel motor. The power lines described in these patent literatures are attached to an upper arm of the suspension device by a clamp member or are attached to the in-wheel motor by a clamp member.

CITATION LIST

Patent Literatures

Patent Literature 1: Japanese Patent No. 4,628,136
Patent Literature 2: Japanese Unexamined Patent Application Publication No. 2006-240430

SUMMARY OF INVENTION

Technical Problem

However, such conventional power lines have the following problems. When the in-wheel motor is steered, the power lines connected to the in-wheel motor are displaced about a steering axis. The power lines are thick and hard to bend. However, the power lines are bent and extended every time the in-wheel motor is steered to the right or left from the direction in which the vehicle is moving straight, or the power lines are repeatedly bent in the lateral direction at the same position so as to repeatedly alternately have a mountain fold and a valley fold. If the power lines are repeatedly bent and extended at the same position over a long period, bending fatigue accumulates, causing degradation.

Conventionally, a wheel, an in-wheel motor drive device, a suspension device, and power lines are disposed in a wheel well of a vehicle body. Accordingly, if longer power lines are used to reduce bending and extension of the power lines, a larger wheel well is required, which results in smaller internal space of the vehicle body such as passenger space and cargo space. This degrades loading capability of electric vehicles.

The power lines described in the patent literatures are placed so as to extend substantially horizontally from the in-wheel motor toward the inside in the lateral direction of the vehicle, or are placed so as to extend upward from the in-wheel motor toward the inside in the lateral direction of the vehicle. Accordingly, a through hole is formed in the wheel well of the vehicle body and the power lines extending in the lateral direction of the vehicle are passed through the through hole. Forming such a through hole reduces rigidity and strength of the wheel well and a vehicle body structural material.

In view of the above circumstances, the present invention relates to in-wheel motor drive devices for steered wheels and it is an object of the present invention to provide a technique of reducing bending and extension of power lines during steering. It is another object of the present invention to provide the layout of in-wheel motor power lines which does not sacrifice internal space of a vehicle body and that does not require formation of a through hole in a wheel well and a vehicle body structural material.

Solution to Problem

In order to achieve the above objects, a wiring structure for an in-wheel motor power line according to the present invention includes: an in-wheel motor drive device that is disposed inside a wheel to drive a wheel; a suspension device that couples the in-wheel motor drive device to a vehicle body such that the in-wheel motor drive device can be steered about a steering axis extending in a vertical direction; and a bendable power line that has its one end connected to a power line connection portion provided on the in-wheel motor drive device and the other end extending to the vehicle body and that supplies electric power from the vehicle body to the in-wheel motor drive device. The power line includes, between the one end and the other end, an in-wheel motor drive device-side region extending in the vertical direction along the steering axis.

According to the present invention, the in-wheel motor drive device-side region of the power line is placed near the steering axis. Accordingly, when the in-wheel motor drive device is steered, the power line is hardly displaced, and the in-wheel motor drive device-side region that is long in the vertical direction is merely twisted. The power line therefore will not be repeatedly bent and extended, and bending fatigue will not accumulate in the power line. Displacement and bending and extension of the power line associated with steering can therefore be reduced as compared to conventional examples. The "in-wheel motor drive device-side region extending in the vertical direction along the steering axis" includes the case where a part of the power line extends so as to overlap the steering axis and the case where a part of the power line is located near the steering axis and extends substantially parallel to the steering axis. For example, "near the steering axis" is a region with a predetermined radius about the steering axis. The region with a predetermined radius is not particularly limited. However, for example, the region with a predetermined radius is determined based on a coil spring seat of a shock absorber disposed along the steering axis. Namely, the region with a predetermined radius is a region with a radius that is twice that of the coil spring seat. In the case where there are a plurality of power lines, at least one of the power lines need only extend in the vertical direction along the steering axis.

However, it is preferable that the plurality of power lines be disposed so as to extend in the vertical direction along the steering axis.

The wiring layout of the power line is not particularly limited. However, in a preferred embodiment of the present invention, the power line further includes an intermediate region and a vehicle body-side region between the in-wheel motor drive device-side region and the other end, an upper side of the in-wheel motor drive device-side region is connected to the in-wheel motor drive device side, and a lower side of the in-wheel motor drive device-side region is connected to the intermediate region, the vehicle body-side region extends in the vertical direction, a lower side of the vehicle body-side region is connected to the intermediate region, an upper side of the vehicle body-side region is connected to the vehicle body side, and the intermediate region is curved with its both sides located at a higher position and its intermediate part located at a lower position. Alternatively, in another embodiment of the present invention, the power line further includes an intermediate region and a vehicle body-side region between the in-wheel motor drive device-side region and the other end, a lower side of the in-wheel motor drive device-side region is connected to the in-wheel motor drive device side, an upper side of the in-wheel motor drive device-side region is connected to the intermediate region, the vehicle body-side region extends in the vertical direction, an upper side of the vehicle body-side region is connected to the intermediate region, a lower side of the vehicle body-side region is connected to the vehicle body side, and the intermediate region is curved with its both sides located at a lower position and its intermediate part located at a higher position. According to these embodiments, curvature of the intermediate region hardly changes. According to these embodiments, the vehicle body-side region extends in the vertical direction, and the upper or lower side of the vehicle body-side region is connected to the vehicle body side. This configuration allows the power line to be placed such that a part of the power line bypasses a wheel well of the vehicle body, such as, e.g., placing the power line such that the vehicle body-side region extends along the back surface (the surface facing toward the inside of the vehicle body) of a wheel well partition wall that separates the wheel well from the internal space of the vehicle. Accordingly, there is no need to form a through hole in the wheel well partition wall and pass the power line through the through hole, and there is also no need to increase the size of the wheel well. Rigidity and strength of the wheel well therefore will not be reduced, and the internal space of the vehicle body will not be sacrificed.

In a preferred embodiment of the present invention, the wiring structure for the in-wheel motor power line includes: a plurality of the power lines, and the one ends of the power lines which are connected to the power line connection portions are disposed so as to at least partially overlap each other as viewed in a direction of the steering axis. According to this embodiment, the one ends of the power lines which extend from the power line connection portions are disposed so as to at least partially overlap each other as viewed in the direction of the steering axis. This configuration allows the one ends of the plurality of power lines to be disposed at substantially the same distance from the steering axis. Accordingly, steering stress will not concentrate on a specific power line, and all of the power lines can have substantially the same length of life. The overall life of the power lines can thus be extended. The one ends of all of the power lines may overlap each other in the same overlap region, or the one ends of two or more of the power lines may overlap each other in the same overlap region. Alternatively, the one ends of at least two adjacent ones of the power lines may overlap each other. In another embodiment, the plurality of power lines may be bundled and covered by a common sheath to form a single cable.

The power line of the present invention may have its one end connected to the power line connection portion and extend downward from the one end to form the in-wheel motor drive device-side region. Alternatively, in a preferred embodiment of the present invention, the power line further includes a wheel vicinity region between the one end and the in-wheel motor drive device-side region, the wheel vicinity region extends in the vertical direction, a lower side of the wheel vicinity region is connected to the power line connection portion side, and an upper side of the wheel vicinity region is connected to the in-wheel motor drive device-side region. According to this embodiment, the in-wheel motor drive device-side region has a greater length as compared to the power line extending downward from the one end to form the in-wheel motor drive device-side region. The extent to which the in-wheel motor drive device-side region is twisted per unit length when the in-wheel motor drive device is steered can thus be reduced.

In a preferred embodiment of the present invention, the wheel vicinity region is held by a clamp member provided on the suspension device. According to this embodiment, the wheel vicinity region can be held so as to extend in the vertical direction.

In an embodiment of the present invention, at least one of the in-wheel motor drive device-side region, the intermediate region, and the vehicle body-side region is not held by anything. According to this embodiment, since at least one of the regions is not held by anything, this region can be bent or twisted as necessary. Steering stress therefore will not concentrate on a specific part of this region, and the life of the power line can be extended. In another embodiment, at least one of the in-wheel motor drive device-side region, the intermediate region, and the vehicle body-side region may be held by a clamp member or contact another member so that bending of that region is restricted.

In an embodiment of the present invention, the power line is held, at a position located closer to the other side than the vehicle body-side region is, by a clamp member provided on the vehicle body. According to this embodiment, the power line on the in-wheel motor drive device side is suspended from the clamp member, whereby the vehicle body-side region can be made to extend in the vertical direction. In another embodiment, the vehicle body-side region may be held by a clamp member so as to extend in the vertical direction.

In an embodiment of the present invention, the intermediate region of the power line extends in a lateral direction of a vehicle. According to this embodiment, the in-wheel motor drive device-side region located on the one end side can be separated in the lateral direction of the vehicle from the vehicle body-side region located on the other end side. This avoids interference of the in-wheel motor drive device with the vehicle body-side region when the in-wheel motor drive device is steered. In a more preferred embodiment, the in-wheel motor drive device-side region need only be disposed so as to overlap the vehicle body-side region in a longitudinal direction of the vehicle when the vehicle is moving straight, namely when the in-wheel motor drive device is not steered to the right or left. Alternatively, the power line may be placed such that the in-wheel motor drive device-side region is separated from the vehicle body-side region in the longitudinal direction of the vehicle and the intermediate region extends obliquely as viewed from above.

It is desirable that the one end of the power line be passed through a sleeve near the power line connection portion and be protected by the sleeve. In an embodiment of the present invention, the one end of the power line which extends from the power line connection portion is passed through a sleeve, each of the sleeves together with the one end of the power line is inserted through a through hole of the power line connection portion and is fixed therein to hold the one end of the power line and to seal annular clearance between the power line and the through hole, and the sleeves are disposed so as to at least partially overlap each other as viewed in the direction of the steering axis. According to this embodiment, the one ends of the power lines which extend from the power line connection portions can be disposed so as to at least partially overlap each other as viewed in the direction of the steering axis. This configuration allows the one ends of the plurality of power lines to be disposed at substantially the same distance from the steering axis. Accordingly, steering stress will not concentrate on a specific power line, and all of the power lines can have substantially the same length of life. The overall life of the power lines can thus be extended. All of the sleeves may overlap each other in the same overlap region, or at least two of the sleeves may overlap each other in the same overlap region. Alternatively, at least two adjacent ones of the sleeves may overlap each other.

The suspension device of the present invention may be a double wishbone suspension device or may be other types of suspension device. Although not particularly limited, in an embodiment of the present invention, the suspension device includes a strut coupled to an upper part of the in-wheel motor drive device and a lower arm coupled to a lower part of the in-wheel motor drive device, the strut includes a coil spring and a pair of coil spring seats that are disposed on upper and lower ends of the coil spring to hold the coil spring therebetween, and is capable of extending and contracting in the direction of the steering axis, and the one ends of the power lines which are connected to the power line connection portions are disposed so as to overlap the coil spring seat as viewed in the direction of the steering axis. According to this embodiment, the one ends of the power lines are disposed near the steering axis, and the extent to which the power lines are twisted when the in-wheel motor drive device is steered can be reduced. The in-wheel motor drive device-side regions are also disposed near the steering angle. The closer the in-wheel motor drive device-side regions are to the steering axis K, the more the extent to which the in-wheel motor drive device-side regions are twisted when the in-wheel motor drive device is steered can be reduced.

The present invention may be an in-wheel motor drive device including an in-wheel motor power line and capable of being steered. That is, the in-wheel motor drive device of the present invention includes: a hub ring that is coupled to a wheel; a motor unit having a motor rotary shaft that drives the hub ring, a motor casing that serves as an outer shell, and a power line connection portion provided on the motor casing; and a bendable power line that has its one end connected to the power line connection portion and the other end extending to a vehicle body located outside the motor casing, and that supplies electric power from the vehicle body to the motor unit, and the in-wheel motor drive device is coupled to the vehicle body such that the in-wheel motor drive device can be steered about a steering axis extending in a vertical direction. The power line includes, between the one end and the other end thereof, an in-wheel motor drive device-side region, an intermediate region, and a vehicle body-side region which extend continuously. Of these regions, the in-wheel motor drive device-side region extends in the vertical direction, an upper side of the in-wheel motor drive device-side region is connected to the power line connection portion side, and a lower side of the in-wheel motor drive device-side region is connected to the intermediate region. The vehicle body-side region extends in the vertical direction, a lower side of the vehicle body-side region is connected to the intermediate region, and an upper side of the vehicle body-side region is connected to the vehicle body side. The intermediate region is curved with its both sides located at a higher position and its intermediate part located at a lower position.

According to the present invention, the in-wheel motor drive device-side region of the power line can be placed near the steering axis, and displacement and bending and extension of the power line associated with steering can be reduced as compared to the conventional examples. According to the present invention, when the in-wheel motor drive device is steered, the power line is hardly displaced, and curvature of the intermediate region hardly changes, and the in-wheel motor drive device-side region that is long in the vertical direction is merely twisted. The power line therefore will not be repeatedly bent and extended, and bending fatigue will not accumulate in the power line. According to the present invention, the vehicle body-side region extends in the vertical direction, and the upper side of the vehicle body-side region is connected to the vehicle body side. The power line can therefore be placed so as to bypass the wheel well of the vehicle body. Accordingly, there is no need to form a through hole in the wheel well and pass the power line through the through hole, and there is also no need to increase the size of the wheel well. Rigidity and strength of the wheel well therefore will not be reduced, and the internal space of the vehicle body will not be sacrificed.

Advantageous Effects of Invention

As described above, according to the present invention, a preferred power line layout can be provided for a power line of an in-wheel motor drive device. The power line will not be repeatedly bent and extended when the in-wheel motor drive device is steered, and durability of the power line is improved. A wheel well of a vehicle body can be reduced in size, and the internal space of a vehicle body can be increased. Moreover, steering stress will not concentrate on a specific one of a plurality of the power lines, whereby the life of every power line can be extended.

DESCRIPTION OF EMBODIMENTS

Figure 1:
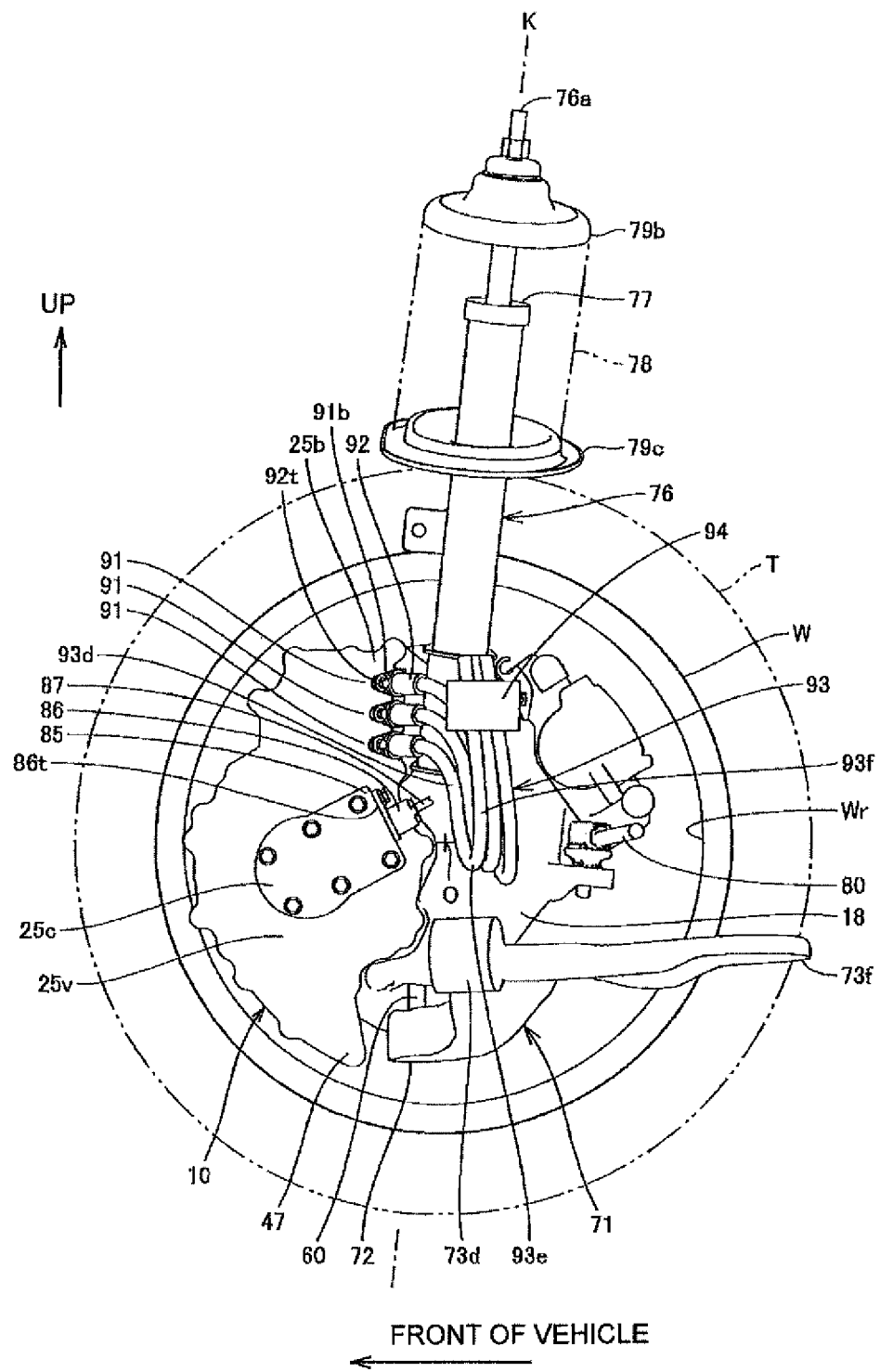
FIG. 1 is a schematic view showing a wiring structure for in-wheel motor power lines according to a first embodiment of the present invention as viewed from inside in the lateral direction of a vehicle.
Figure 2:
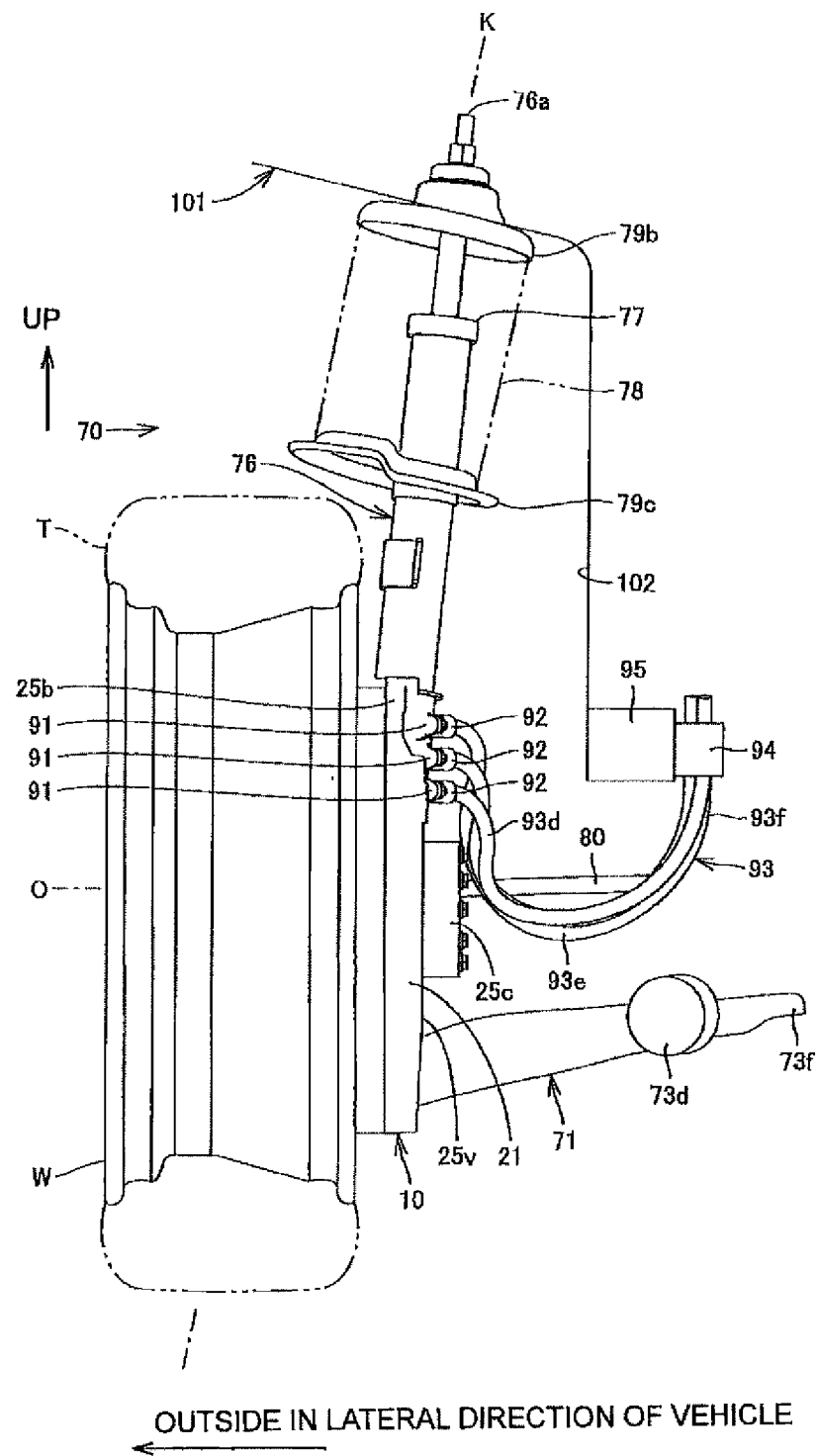
FIG. 2 is a schematic view of the first embodiment as viewed from the front of the vehicle.
Figure 3:
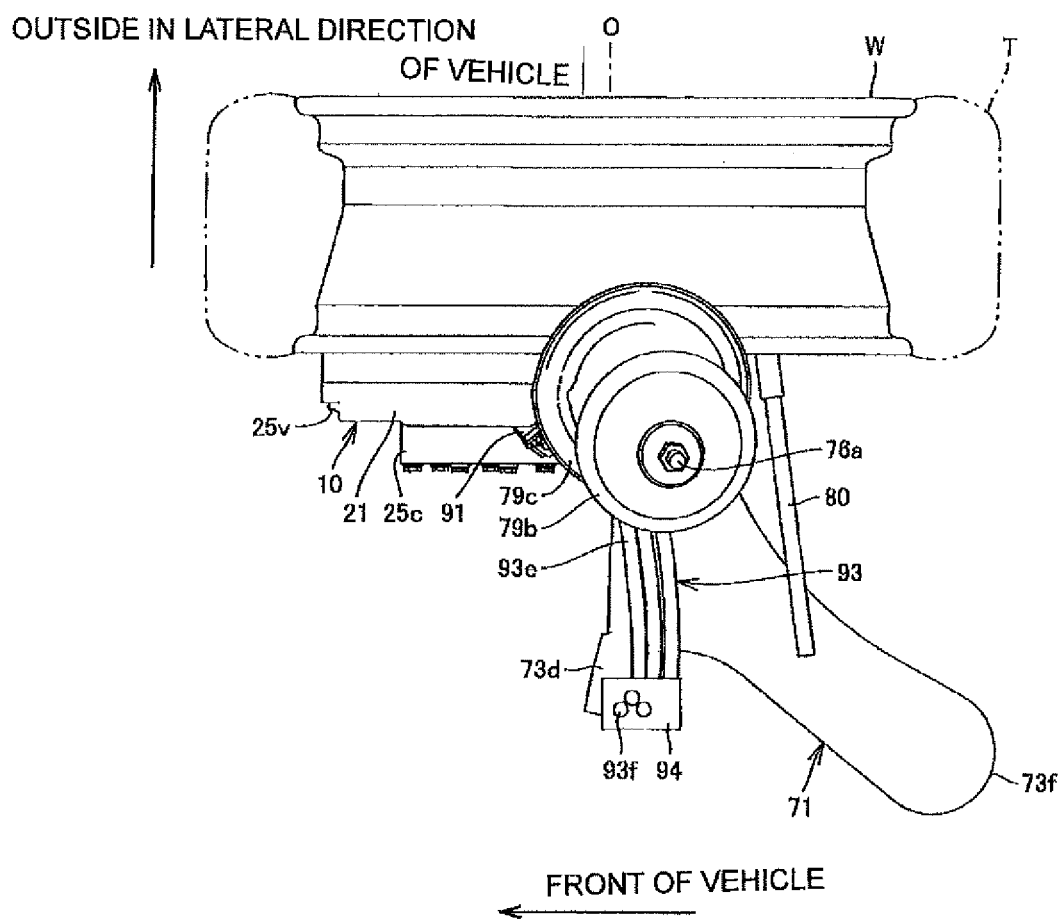
FIG. 3 is a schematic view of the first embodiment as viewed from above the vehicle.

Embodiments of the present invention will be described in detail below with reference to the accompanying drawings. FIG. 1 is a schematic view showing a wiring structure for in-wheel motor power lines according to a first embodiment of the present invention as viewed from inside in the lateral direction of a vehicle. FIG. 2 is a schematic view of the first embodiment as viewed from the front of the vehicle. FIG. 3 is a schematic view of the first embodiment as viewed from above. In the first embodiment, a road wheel W, an in-wheel motor drive device 10, and a suspension device 70 are disposed outside a vehicle body 101 (only an outer part in the lateral direction of the vehicle body is shown in FIG. 2) in the lateral direction of the vehicle. The road wheel W, the in-wheel motor drive device 10, and the suspension device 70 are disposed symmetrically on both sides of the vehicle body 101 in the lateral direction of the vehicle to form an electric vehicle.

A tire T, which is shown in phantom, is fitted on the road wheel W. The road wheel W and the tire T form a wheel. A rim portion Wr of the road wheel W defines an inner space region of the wheel. The in-wheel motor drive device 10 is disposed in the inner space region. The in-wheel motor drive device 10 is coupled to the road wheel W to drive the wheel.

The suspension device 70 is a MacPherson strut suspension device and includes a lower arm 71 extending in the lateral direction of the vehicle and a strut 76 disposed above the lower arm 71 and extending in the vertical direction. The strut 76 is disposed inward of the road wheel W and the in-wheel motor drive device 10 in the lateral direction of the vehicle. The lower end of the strut 76 is coupled to the in-wheel motor drive device 10, and the upper end of the strut 76 is coupled to the vehicle body 101 at a position above the road wheel W. The strut 76, the upper part of the road wheel W, and the upper part of the in-wheel motor drive device 10 are accommodated in a wheel well 102 formed outside the vehicle body 101 in the lateral direction of the vehicle.

The strut 76 is a suspension member containing a shock absorber 77 in its upper end region and capable of extending and contracting in the vertical direction. A coil spring 78, which is schematically shown in phantom, is disposed around the shock absorber 77 to absorb a vertical axial force that is applied to the strut 76. A pair of coil spring seats 79b, 79c, which are disposed on the upper and lower ends of the coil spring 78 to hold the coil spring 78 therebetween, are placed in the upper end and the middle part of the strut 76. A damper that absorbs the axial force that is applied to the strut 76 is placed in the shock absorber 88.

The lower arm 71 is a suspension member disposed below an axis O of the in-wheel motor drive device 10, and includes a lateral outer end 72 and lateral inner ends 73d, 73f. The lower arm 71 is coupled at the lateral outer end 72 to the in-wheel motor drive device 10 via a ball joint 60. The lower arm 71 is coupled at the lateral inner ends 73d, 73f to a vehicle body-side member, not shown. The lower arm 71 can swing in the vertical direction with the lateral inner ends 73d, 73f serving as a base end and the lateral outer end 72 as a free end. The "vehicle body-side member" refers to a member that is attached on the vehicle body side with respect to a member being described. A straight line connecting the lateral outer end 72 and an upper end 76a of the strut 76 extends in the vertical direction and forms a steering axis K. The steering axis K basically extends in the vertical direction, but may be slightly tilted in the lateral direction and/or the longitudinal direction of the vehicle. In the figures, the lateral inner ends 73d, 73f are simply designated by the reference numeral 73 when they are not distinguished.

A tie rod 80 is disposed above the lower arm 71. The tie rod 80 is disposed closer to the rear of the vehicle than the axis O is, and extends in the lateral direction. A lateral outer end of the tie rod 80 is rotatably coupled to the rear part of the in-wheel motor drive device 10. The rear part of the in-wheel motor drive device 10 means the rear part in the longitudinal direction of the vehicle. A lateral inner end of the tie rod 80 is coupled to a steering device, not shown. The steering device advances and withdraws the tie rod 80 in the lateral direction of the vehicle to steer the in-wheel motor drive device 10 and the road wheel W about the steering axis K.

Next, the in-wheel motor drive device will be described.

Figure 4:
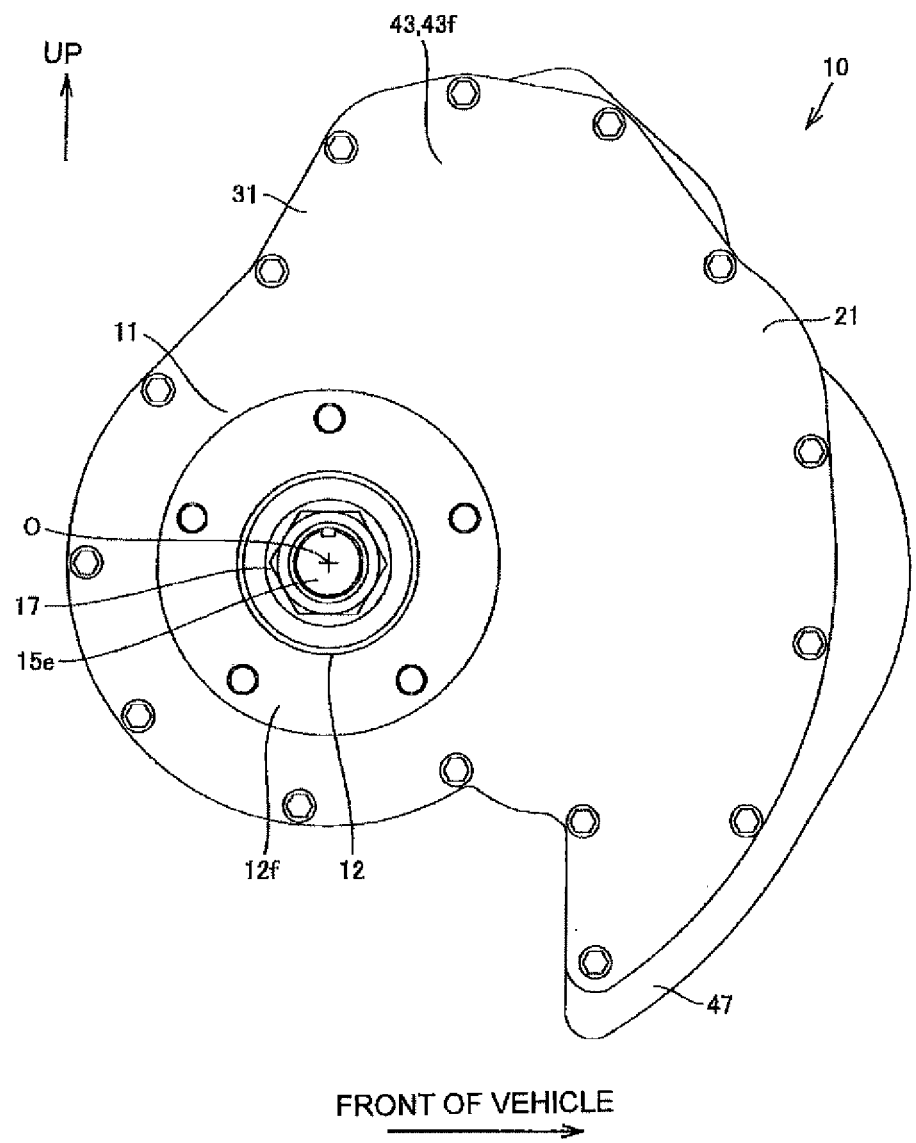
FIG. 4 is a schematic view showing only an in-wheel motor drive device, as viewed from outside in the lateral direction of the vehicle.
Figure 5:
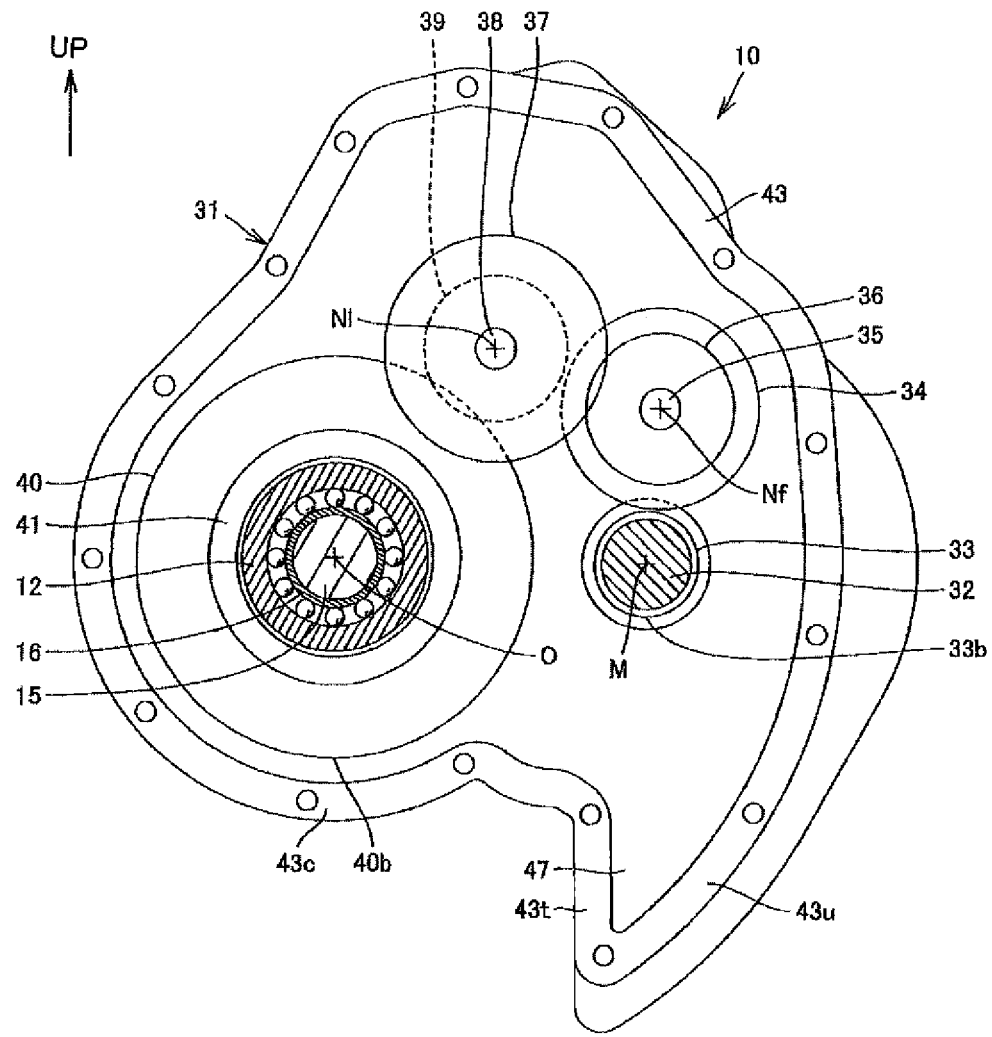
FIG. 5 is a transverse section of the in-wheel motor drive device.
Figure 6:
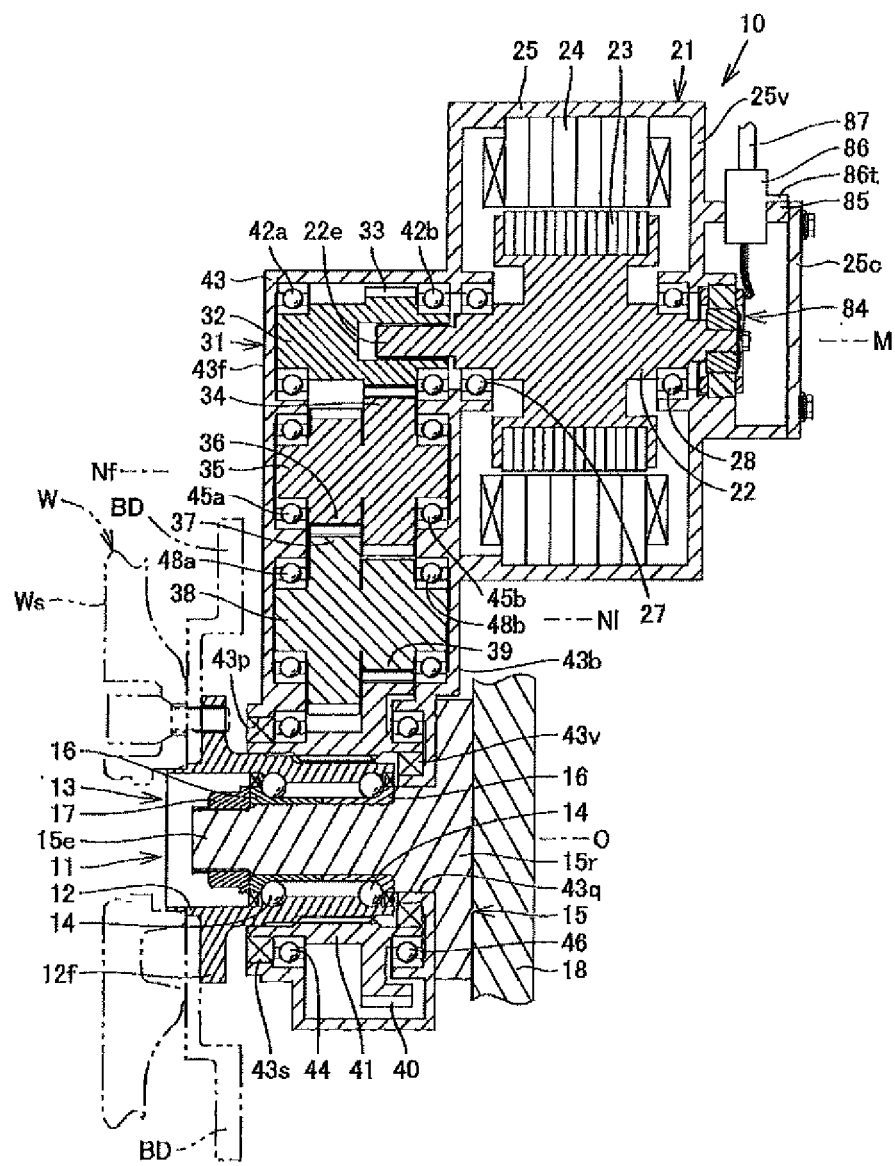
FIG. 6 is a developed section of the in-wheel motor drive device.
Figure 7:
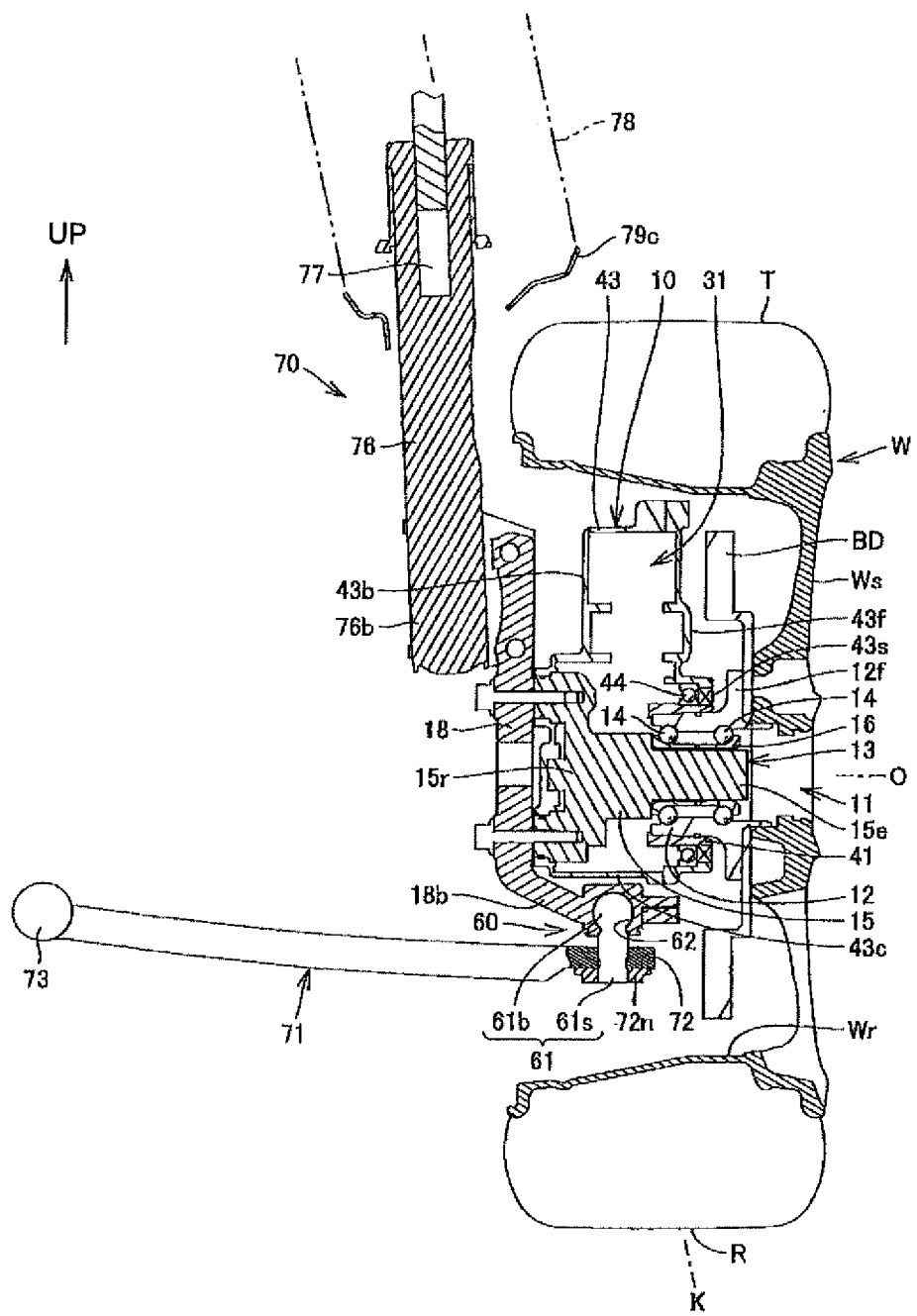
FIG. 7 is a longitudinal section schematically showing the in-wheel motor drive device and a suspension device.

FIG. 4 is a schematic view showing only the in-wheel motor drive device shown in FIGS. 1 to 3, as viewed from outside in the lateral direction of the vehicle. FIG. 5 is a transverse section schematically showing the in-wheel motor drive device as viewed from outside in the lateral direction of the vehicle. In FIG. 5, each gear in a speed reduction unit is shown by an addendum circle, and individual teeth are not shown. FIG. 6 is a developed section schematically showing the in-wheel motor drive device. The cutting plane in FIG. 6 is a developed plane connecting a plane including an axis M and an axis Nf shown in FIG. 5, a plane including the axis Nf and an axis Nl, and a plane including the axis Nl and the axis O in this order. FIG. 7 is a longitudinal section showing the in-wheel motor drive device together with the wheel and the suspension device. For simplicity of the figure, the gears in the speed reduction unit are not shown in FIG. 7.

The in-wheel motor drive device 10 includes a wheel hub bearing unit 11 that, as shown in FIG. 6, is coupled to the center of the road wheel W shown in phantom, a motor unit 21 that drives the road wheel W of the wheel, and a speed reduction unit 31 that reduces the speed of rotation of the motor unit to transmit the resultant rotation to the wheel hub bearing unit 11. The in-wheel motor drive device 10 is disposed in the wheel well, not shown, of the electric vehicle. The motor unit 21 and the speed reduction unit 31 are not disposed coaxially with the wheel hub bearing unit 11, namely are not disposed on the axis O of the wheel hub bearing unit 11. The motor unit 21 and the speed reduction unit 31 are offset from the axis O of the wheel hub bearing unit 11 as shown in FIG. 5. The in-wheel motor drive device 10 can drive the electric vehicle at 0 to 180 km/h on public roads.

The wheel hub bearing unit 11 has an outer ring 12 that serves as a hub ring coupled to the road wheel W as shown in FIG. 6, an inner fixing member 13 inserted in a central hole of the outer ring 12, and a plurality of rolling elements 14 disposed in annular clearance between the outer ring 12 and the inner fixing member 13, and the wheel hub bearing unit 11 forms an axle. The inner fixing member 13 includes a non-rotary fixed shaft 15, a pair of inner races 16, a retaining nut 17, and a carrier 18. The fixed shaft 15 has a larger diameter in its root part 15r than in its tip end 15e. The inner races 16 are fitted on the fixed shaft 15 between the root part 15r and the tip end 15e. The retaining nut 17 is screwed on the tip end 15e of the fixed shaft 15 to fix the inner races 16 between the retaining nut 17 and the root part 15r.

The fixed shaft 15 extends along the axis O and extends through a body casing 43 that serves as an outer shell of the speed reduction unit 31. The tip end 15e of the fixed shaft 15 extends through an opening 43p formed in a front part 43f of the body casing 43, and projects laterally outward beyond the front part 43f. The root part 15r of the fixed shaft 15 extends through an opening 43q, which is formed in a back part 43b of the body casing 43, from inward of the back part 43b in the lateral direction of the vehicle. The front part 43f and the back part 43b are wall portions that face each other at an interval in the direction of the axis O. The root part 15r is located inward of the back part 43b in the lateral direction of the vehicle. The carrier 18 is firmly attached to the root part 15r. The carrier 18 is located outside the body casing 43 and coupled to the suspension device 70 and the tie rod 80.

The rolling elements 14 are arranged in two rows separated in the direction of the axis O. The outer peripheral surface of the inner race 16 located on one side in the direction of the axis O forms an inner raceway surface for the first row of the rolling elements 14 and faces a part of the inner peripheral surface of the outer ring 12 which is located on the one side in the direction of the axis O. The outer peripheral surface of the inner race 16 located on the other side in the direction of the axis O forms an inner raceway surface for the second row of the rolling elements 14 and faces a part of the inner peripheral surface of the outer ring 12 which is located on the other side in the direction of the axis O. In the following description, the outer side in the lateral direction of the vehicle (outboard side) is sometimes referred to as the one side in the axial direction, and the inner side in the lateral direction of the vehicle (inboard side) is sometimes referred to as the other side in the axial direction. The lateral direction in the plane of paper of FIG. 6 corresponds to the lateral direction of the vehicle. The inner peripheral surface of the outer ring 12 forms an outer raceway surface for the rolling elements 14.

The outer ring 12 has a flange portion 12f in its end located on the one side in the direction of the axis O. The flange portion 12f forms a coupling seat that is coaxially coupled to a brake disc BD and a spoke portion Ws of the road wheel W. The flange portion 12f of the outer ring 12 is coupled to the brake disc BD and the road wheel W, so that the outer ring 12 rotates with the road wheel W. In a modification, not shown, the flange portion 12f may be projections projecting radially outward at intervals in the circumferential direction.

As shown in FIG. 6, the motor unit 21 includes a motor rotary shaft 22, a rotor 23, a stator 24, a motor casing 25, which are arranged in this order from the axis M of the motor unit 21 toward the outside in the radial direction. The motor unit 21 is an inner rotor, outer stator radial gap motor. However, the motor unit 21 may be of other types. Although not shown in the figures, the motor unit 21 may be, e.g., an axial gap motor.

The axis M, which is the center of rotation of the motor rotary shaft 22 and the rotor 23, extends parallel to the axis O of the wheel hub bearing unit 11. That is, the motor unit 21 is offset so as to be separated from the axis O of the wheel hub bearing unit 11. As shown in FIG. 6, a large part of the motor unit 21 excluding the tip end of the motor rotary shaft 22 does not overlap the inner fixing member 13 in the axial direction. The motor casing 25 is tubular, is coupled at its end on the one side in the direction of the axis M to the back part 43b of the body casing 43, and is sealed at its end on the other side in the direction of the axis M to a lid-like motor casing cover 25v. Both ends of the motor rotary shaft 22 are rotatably supported by the back part 43b and the motor casing cover 25v via rolling bearings 27, 28. The motor unit 21 drives the outer ring 12 and the wheel.

As shown in FIG. 1, a power line terminal box 25b is disposed on the upper part of the in-wheel motor drive device 10. The power line terminal box 25b extends over the upper part of the motor casing 25 (FIG. 6) and the upper part of the motor casing cover 25v (FIG. 6) and has a plurality of power line connection portions 91. The power line terminal box 25b of the present embodiment has three power line connection portions 91 and receives three-phase AC power. One ends of power lines 93 are connected to power line connection portions 91. In the power line terminal box 25b, a core wire of the power lines 93 are connected to leads extending from a coil of the stator 24.

A signal line terminal box 25c is formed on the central part of the motor casing cover 25v. The signal line terminal box 25c is separated from the power line terminal box 25b. The signal line terminal box 25c is disposed so as to cross the axis M as shown in FIG. 6. The signal line terminal box 25c accommodates a rotation angle sensor 84. The rotation angle sensor 84 is placed on an axial end of the motor rotary shaft 22 and detects the rotation angle of the motor rotary shaft 22. The signal line terminal box 25c has a signal line connection portion 85. The signal line connection portion 85 has a wall portion of the signal line terminal box 25c, a through hole extending through the wall portion, and an internally threaded hole (not shown) formed in the wall portion near the through hole. A sleeve 86 and a signal line 87 are passed through the through hole. The sleeve 86 is a tubular member and is in close contact with the outer periphery of the signal line 87 to protect the signal line 87 and to seal annular clearance between the through hole and the signal line 87. The sleeve 86 has on its outer peripheral surface a tongue 86t projecting outward in the radial direction of the sleeve 86. A bolt, not shown in FIG. 6, is screwed into the tongue 86t and the internally threaded hole of the signal line connection portion 85, whereby the sleeve 86 is firmly attached to the signal line connection portion 85.

The signal line 87 is formed by a plurality of core wires that are conductors and a covering that is made of an insulating material and covers the plurality of core wires so as to bundle them together. The signal line 87 is bendable. One end of the signal line 87 is connected to the signal line connection portion 85. Although not shown in the figures, the signal line 87 extends from the one end to the vehicle body 101 (FIG. 2).

Each power line connection portion 91 is configured similarly to the signal line connection portion 85, and has a wall portion of the power line terminal box 25*b*, a through hole extending through the wall portion, and an internally threaded hole (not shown) formed in the wall portion near the through hole. A sleeve 92 and the one end of the power line 93 are passed through the through hole. The sleeve 92 and the power line 93 extend toward the vehicle body 101 from the through hole of the power line connection portion 91. The power line 93 is passed through the sleeve 92 and extends toward the vehicle body 101 from the sleeve 92. Each sleeve 92 is a tubular member and is in close contact with the outer periphery of the power line 93 to protect the power line 93. Each sleeve 92 together with the one end of the power line 93 is inserted through the through hole of the power line connection portion 91 and is fixed therein to hold the one end of the power line 93 and to seal annular clearance between the power line 93 and the through hole. In order to retain the sleeve 92 in the through hole, the sleeve 92 has on its outer peripheral surface a tongue 92*t* projecting outward in the radial direction of the sleeve 92. A bolt 91*b* shown in FIG. 1 is screwed into the tongue 92*t* and the internally threaded hole of the power line connection portion 91, whereby the sleeve 92 is firmly attached to the power line connection portion 91.

The speed reduction unit 31 includes an input shaft 32, an input gear 33, an intermediate gear 34, an intermediate shaft 35, an intermediate gear 36, an intermediate gear 37, an intermediate shaft 38, an intermediate gear 39, an output gear 40, an output shaft 41, and the body casing 43. The input shaft 32 is a tubular member having a larger diameter than a tip end 22*e* of the motor rotary shaft 22 and extends along the axis M of the motor unit 21. The tip end 22*e* is placed in a central hole formed in an end of the input shaft 32 which is located on the other side in the direction of the axis M, so that the input shaft 32 is coaxially coupled to the motor rotary shaft 22. Both ends of the input shaft 32 are supported by the body casing 43 via rolling bearings 42*a*, 42*b*. The input gear 33 is an external gear having a smaller diameter than the motor unit 21 and is coaxially coupled to the input shaft 32. Specifically, the input gear 33 is integrally formed on the outer periphery of the middle part of the input shaft 32 in the direction of the axis M.

The output shaft 41 is a tubular member having a larger diameter than a cylindrical portion of the outer ring 12 and extends along the axis O of the wheel hub bearing unit 11. An end of the outer ring 12 which is located on the other side in the direction of the axis O is placed in a central hole formed in an end of the output shaft 41 which is located on the one side in the direction of the axial O, so that the output shaft 41 is coaxially coupled to the outer ring 12. Rolling bearings 44, 46 are disposed on both ends of the output shaft 41 in the direction of the axis O. The end of the output shaft 41 which is located on the one side in the direction of the axis O is supported by the front part 43*f* of the body casing 43 via the rolling bearing 443. The end of the output shaft 41 which is located on the other side in the direction of the axis O is supported by the back part 43*b* of the body casing 43 via the rolling bearing 46. The output gear 40 is an external gear and is coaxially coupled to the output shaft 41. Specifically, the output gear 40 is integrally formed on the outer periphery of the end of the output shaft 41 which is located on the other side in the direction of the axis O.

The two intermediate shafts 35, 38 extend parallel to the input shaft 32 and the output shaft 41. That is, the speed reduction unit 31 is a parallel shaft gear reducer having four shafts. The axis O of the output shaft 41, the axis Nf of the intermediate shaft 35, the axis Nl of the intermediate shaft 38, and the axis M of the input shaft 32 extend parallel to each other, namely extend in the lateral direction of the vehicle.

The position of each shaft in the longitudinal direction of the vehicle will be described. As shown in FIG. 1, the axis M of the input shaft 32 is located closer to the front of the vehicle than the axis O of the output shaft 41 is. The axis Nf of the intermediate shaft 35 is located closer to the front of the vehicle than the axis M of the input shaft 32 is. The axis Nl of the intermediate shaft 38 is located closer to the front of the vehicle than the axis O of the output shaft 41 is, and is located closer to the rear of the vehicle than the axis M of the input shaft 32 is. In a modification, not shown, the axis M of the input shaft 32, the axis Nf of the intermediate shaft 35, the axis Nl of the intermediate shaft 38, and the axis O of the output shaft 41 may be located in this order from front to rear in the longitudinal direction of the vehicle. This order is also the order in which a driving force is transmitted.

The vertical position of shaft will be described. The axis M of the input shaft 32 is located above the axis O of the output shaft 41. The axis Nf of the intermediate shaft 35 is located above the axis M of the input shaft 32. The axis Nl of the intermediate shaft 38 is located above the axis Nf of the intermediate shaft 35. The plurality of intermediate shafts 35, 38 need only be located above the input shaft 32 and the output shaft 41, and in a modification, not shown, the intermediate shaft 35 may be located above the intermediate shaft 38. Alternatively, in another modification, not shown, the output shaft 41 may be located above the input shaft 32.

The intermediate gear 34 and the intermediate gear 36 are external gears and, as shown in FIG. 6, are coaxially coupled to the middle part of the intermediate shaft 35 in the direction of the axis Nf. Both ends of the intermediate shaft 35 are supported by the body casing 43 via rolling bearings 45*a*, 45*b*. The intermediate gear 37 and the intermediate gear 39 are external gears, and are coaxially coupled the middle part of the intermediate shaft 38 in the direction of the axis Nl. Both ends of the intermediate shaft 38 are supported by the body casing 43 via rolling bearings 48*a*, 48*b*.

The body casing 43 serves as an outer shell of the speed reduction unit 31 and the wheel hub bearing unit 11. The body casing 43 is tubular and surrounds the axes O, Nf, Nl, M as shown in FIG. 5. As shown in FIG. 7, the body casing 43 is accommodated in an inner space region of the wheel W. The inner space region of the wheel W is defined by the inner peripheral surface of the rim portion Wr and the spoke portion Ws coupled to an end of the rim portion Wr which is located on the one side in the direction of the axis O. The wheel hub bearing unit 11, the speed reduction unit 31, and a region of the motor unit 21 which is located on the one side in the axial direction is accommodated in the inner space region of the wheel W. A region of the motor unit 21 which is located on the other side in the axial direction protrudes beyond the wheel W toward the other side in the axial direction. The wheel W thus accommodates a large part of the in-wheel motor drive device 10.

Referring to FIG. 5, the body casing 43 has a portion 43*c* located directly below the axis O and a portion located away from the axis O of the output gear 40 in the longitudinal direction of the vehicle, specifically located directly below the axis M of the input gear 33, and projecting downward. This projecting portion forms an oil tank 47 and is located below the portion 43c located directly below the axis O.

Referring to FIG. 7, a lower end 18b of the carrier 18 and the lateral outer end 72 of the lower arm 71 are disposed directly under the portion 43c located directly below the axis O, and the lateral outer end 72 of the lower arm 71 and the lower end 18b are coupled to each other via the ball joint 60 that serves as a pivot therebetween. As shown in FIG. 5, the oil tank 47 is defined by a substantially vertical rear wall portion 43t and a tilted front wall portion 43u and has a triangular shape that tapers downward, as viewed in the direction of the axis O. The rear wall portion 43t faces the ball joint 60 (FIG. 7) in the longitudinal direction of the vehicle at an interval therebetween. The front wall portion 43u faces the front lower part of the rim portion Wr (FIG. 7).

As shown in FIG. 7, the ball joint 60 includes a ball stud 61 and socket 62. The ball stud 61 extends in the vertical direction and has a ball portion 61b formed at its upper end and a stud portion 61s formed at its lower end. The socket 62 is formed in the inner fixed member 13 and slidably accommodates the ball portion 61b. The stud portion 61s extends through the lateral outer end 72 of the lower arm 71 in the vertical direction. The stud portion 61s has an externally threaded lower end, and a nut 72 is screwed on the lower end from below, whereby the stud portion 61s is firmly attached to the lower arm 71. As shown in FIG. 1, the ball joint 60 is located above the lower end of the oil tank 47. The ball joint 60 and the oil tank 47 are disposed in the inner space region of the wheel W, the ball joint 60 is disposed directly below the axis O, and the oil tank 47 is separated from the ball joint 60 in the longitudinal direction of the vehicle. As shown in FIG. 7, the ball joint 60 is disposed outward of the back part 43b in the lateral direction of the vehicle. The steering axis K extends vertically through the ball center of the ball portion 61b and crosses the fixed shaft 15 and a contact surface R of the tire T. The upper end of the carrier 18 is firmly attached to the lower end of the strut 76.

The body casing 43 is tubular and, as shown in FIG. 6, accommodates the input shaft 32, the input gear 33, the intermediate gear 34, the intermediate shaft 35, the intermediate gear 36, the intermediate gear 37, the intermediate shaft 38, the intermediate gear 39, the output gear 40, the output shaft 41, and the middle part of the wheel hub bearing unit 11 in the direction of the axis O. Lubricating oil is sealed in the body casing 43, so that the speed reduction unit 31 is lubricated. The input gear 33, the intermediate gear 34, the intermediate gear 36, the intermediate gear 37, the intermediate gear 39, and the output gear 40 are helical gears.

The body casing 43 has a tubular portion including the portion 43c located directly below the axis O and the oil tank 47 as shown in FIG. 5, the substantially flat front part 43f that covers the one side in the axial direction of a tubular portion of the speed reduction unit 31 as shown in FIG. 6, and the substantially flat back part 43b that covers the other side in the axial direction of the tubular portion of the speed reduction unit 31. The back part 43b is coupled to the motor casing 25. The back part 43b is also coupled to the fixed shaft 15.

The front part 43f has the opening 43p through which the outer ring 12 extends. A sealing material 43s that seals annular clearance between the front part 43f and the outer ring 12 is placed in the opening 43p. The outer ring 12 that is a rotary element is thus accommodated, except for its end located on the one side in the direction of the axis O, in the body casing 43. A sealing material 43v is disposed on the inner peripheral surface of an end of the output shaft 41 which is located on the other side in the direction of the axis O. The sealing material 43v seals annular clearance between the output shaft 41 and the back part 43b.

The input gear 33 having a smaller diameter and the intermediate gear 34 having a larger diameter are disposed on the other side in the axial direction (the motor unit 21 side) of the speed reduction unit 31 and mesh each other. The intermediate gear 36 having a smaller diameter and the intermediate gear 37 having a larger diameter are disposed on the one side in the axial direction (the flange portion 12f side) of the speed reduction unit 31 and mesh with each other. The intermediate gear 39 having a smaller diameter and the output gear 40 having a larger diameter are disposed on the other side in the axial direction of the speed reduction unit 31 and mesh with each other. The input gear 33, the plurality of intermediate gears 34, 36, 37, 39, and the output gear 40 thus mesh with each other, forming a drive transmission path from the input gear 33 through the intermediate gears 34, 36, 37, 39 to the output gear 40. As the smaller diameter drive gears and the larger diameter driven gears mesh with each other as described above, rotation of the input shaft 32 is reduced in speed by the intermediate shaft 35, rotation of the intermediate shaft 35 is reduced in speed by the intermediate shaft 38, and rotation of the intermediate shaft 38 is reduced in speed by the output shaft 41. The speed reduction unit 31 thus has a sufficient reduction ratio. Of the plurality of intermediate gears 34, 36, 37, 39, the intermediate gear 34 is the first intermediate gear located on the input side of the drive transmission path. Of the plurality of intermediate gears, the intermediate gear 39 is the last intermediate gear located on the output side of the drive transmission path.

As shown in FIG. 5, the output shaft 41, the intermediate shaft 38, and the input shaft 32 are arranged in this order so as to be spaced apart from each other in the longitudinal direction of the vehicle. The intermediate shaft 35 and the intermediate shaft 38 are disposed above the input shaft 32 and the output shaft 41. According to the first embodiment, the intermediate shafts can be disposed above the outer ring 12 that serves as a hub ring, so that space where the oil tank 47 is disposed can be provided below the outer ring 12 and space where the ball joint GO (FIG. 7) is accommodated can be provided directly below the outer ring 12. This allows the steering axis K extending in the vertical direction to cross the wheel hub bearing unit 11, whereby the wheel W and the in-wheel motor drive device 10 can be steered in a preferable manner about the steering axis K.

Next, the wiring structure for the in-wheel motor power lines will be described below.

Figure 8:
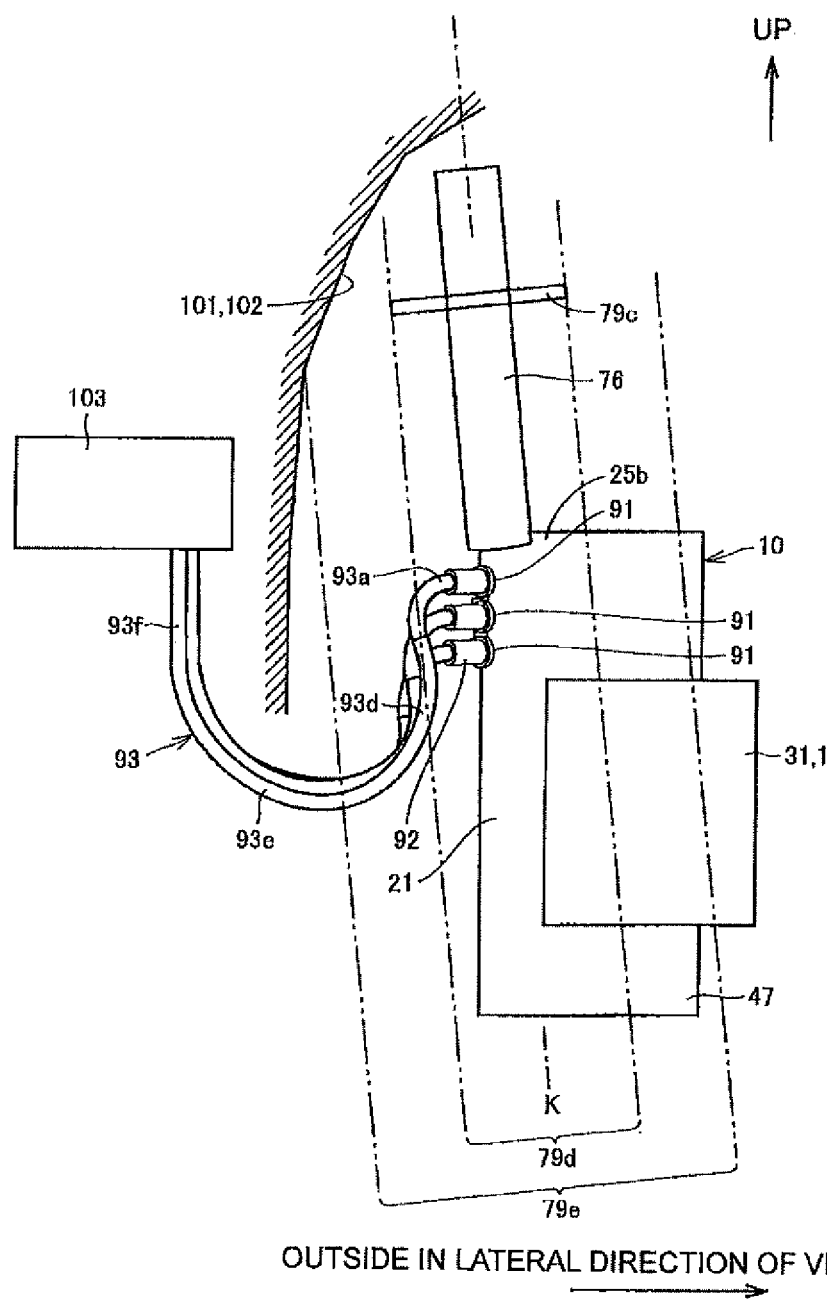
FIG. 8 is a schematic view showing the in-wheel motor drive device and the power lines as viewed from the rear of the vehicle.
Figure 9:
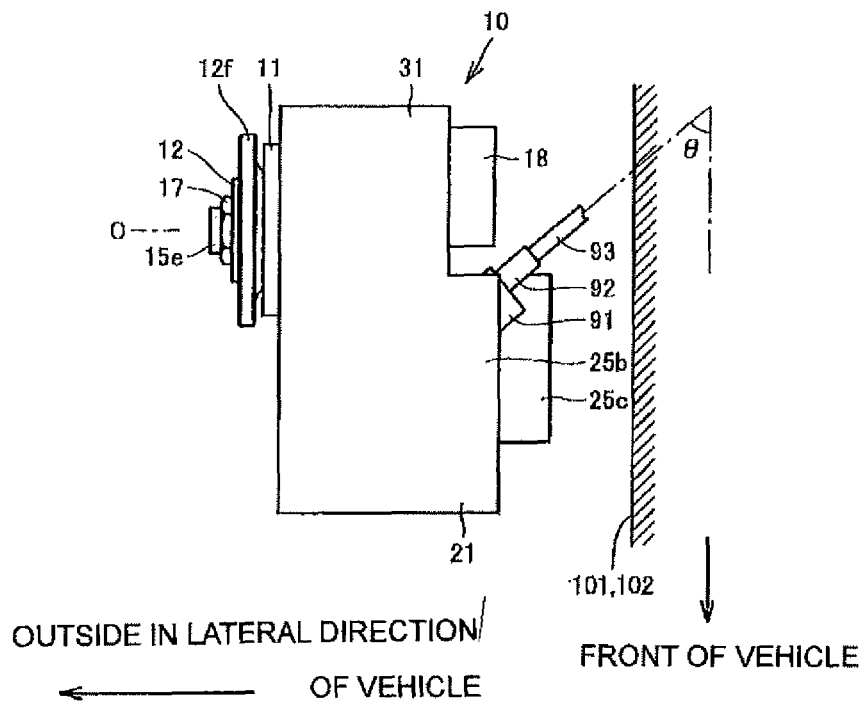
FIG. 9 is a schematic view showing the in-wheel motor drive device and the power lines as viewed from above the vehicle in the direction of a steering axis.

FIGS. 8 and 9 are schematic views showing the in-wheel motor drive device and the power lines. FIG. 8 shows the state as viewed from the rear of the vehicle, and FIG. 9 shows the state as viewed from above the vehicle in the direction of the steering axis. In the first embodiment, the three power lines 93 extend from the in-wheel motor drive device 10 to the vehicle body 101. The three power lines 93 supply three-phase AC power from the vehicle body 101 to the motor unit 21. Each power line 93 is formed by the core wire that are conductor and a shearth that is made of an insulating material and covers the entire circumference of the core wire. Each power line 93 is bendable. One end of each power line 93 is held by the power line connection portion 91 and the sleeve 92 in such an attitude that the other end side of the power line 93 is tilted toward the rear of the vehicle and toward the inside in the lateral direction of the vehicle. Specifically, the one end of each power line 93 is held tilted so as to intersect a base line extending in the longitudinal direction of the vehicle at an angle of 0°. The angle θ is a fixed value included in the range of 0° or more and 90° or less. When θ=0°, the one end of each power line 93 extends parallel to the longitudinal direction of the vehicle. When θ=90°, the one end of each power line 93 extends parallel to the lateral direction of the vehicle. The angle θ is more preferably a fixed value of 10° or more and 80° or less. The other end of each power line 93 is connected to an inverter 103 mounted on the vehicle body 101.

The one ends of the power lines 93 are disposed so as to be aligned at intervals in the direction of the steering axis K as shown in FIG. 8 and to overlap each other as viewed in the direction of the steering axis K as shown in FIG. 9. The one ends of the power lines 93 are disposed such that all of the power line connection portions 91 overlap each other as shown in FIG. 9.

Each power line 93 includes, between the one end and the other end thereof, three regions extending continuously. Of these three regions, the region located on the side connected to the in-wheel motor drive device 10 is referred to as the in-wheel motor drive device-side region 93d, the region located on the side connected to the vehicle body 101 is referred to as the vehicle body-side region 93f, and the region between the in-wheel motor drive device-side region 93d and the vehicle body-side region 93f is referred to as the intermediate region 93e.

The in-wheel motor drive device-side region 93d extends in the vertical direction. The upper side of the in-wheel motor drive device-side region 93d is connected to the in-wheel motor drive device 10 side, and the lower side of the in-wheel motor drive device-side region 93d is connected to the intermediate region 93e. The vehicle body-side region 93f extends in the vertical direction. The lower side of the vehicle body-side region 93f is connected to the intermediate region 93e, and the upper side of the vehicle body-side region 93f is connected to the vehicle body 101 side. The intermediate region 93e is curved with its both sides located at a higher position and its intermediate part located at a lower position.

The one end of each power line 93 which is connected to the power line connection portion 91 first extends horizontally toward the in-wheel motor drive device-side region 93d, but soon changes its direction so as to extend downward, and is connected to the upper side of the in-wheel motor drive device-side region 93d. As shown in FIG. 8, the in-wheel motor drive device-side regions 93d are not held by a clamp member, and are suspended in the air and are disposed along the steering axis K. As used herein, the expression "disposed along the steering axis K" means extending near the steering axis K so as to be substantially parallel to the steering axis K. In the present embodiment, the plurality of in-wheel motor drive device-side regions 93d are disposed in a region 79e with a predetermined radius that is twice the radius of the lower coil spring seat 79c about the steering axis K. The in-wheel motor drive device-side regions 93d thus extend in the vertical direction along the steering axis. At least one of the plurality of in-wheel motor drive device-side regions 93d overlaps a projected region 79d of the lower coil spring seat 79c as viewed in the direction of the steering axis K. It is preferable that the in-wheel motor drive device-side region 93d at least partially or completely overlap the projected region 79d of the lower coil spring seat 79c. The diameter of the projected region 79d substantially corresponds to that of the lower coil spring seat 79c.

As shown in FIG. 2, the plurality of power lines 93 are bundled by a clamp member 94 at a position located closer to the other ends of the power lines 93 than the vehicle body-side regions 93f are, and are thus held by the clamp member 94 so as to extend in the vertical direction. The vehicle body-side regions 93f are not held by a clamp member and are suspended in the air. The vehicle body-side regions 93f are located below the clamp member 94 and extend in the vertical direction. The clamp member 94 is firmly attached to the vehicle body 101 via a bracket 95. Disposing the bracket 95 inward of the wheel well 102 in the lateral direction of the vehicle allows the vehicle body-side regions 93f to be placed inward of a partition wall of the wheel well 102 in the lateral direction of the vehicle. This not only allows the power lines 93 to be placed so as to bypass the wheel well 102 but also allows the partition wall of the wheel well 102 to be placed closer to the in-wheel motor drive device 10 so that the size of the wheel well 102 can be reduced.

As shown in FIG. 2, the clamp member 94 overlaps at least one of the three power line connection portions 91 in the vertical direction. The set of the in-wheel motor drive device-side region 93d, the intermediate region 93e, and the vehicle body-side region 93f is thus held by the in-wheel motor drive device 10 and the vehicle body 101 so as to be curved in a U-shape with its lower side closed and its upper side open.

As shown in FIG. 1, the power line terminal box 25b and the three power line connection portions 91 are disposed closer to the front of the vehicle than the axis O is, and the power line connection portions 91 face toward the rear of the vehicle. This configuration allows the in-wheel motor drive device-side regions 93d to be placed near the steering axis K. Alternatively, in a modification, not shown, the power line terminal box 25b and the three power line connection portions 91 may be disposed closer to the rear of the vehicle than the axis O is, and the power line connection portions 91 may face toward the front of the vehicle.

When the vehicle is moving straight with the wheel W not being steered, the three power line connection portions 91 are located closer to the front of the vehicle than the axis O is, and the clamp member 94 is located closer to the rear of the vehicle than the axis O is. This configuration allows the in-wheel motor drive device-side regions 93d to be placed near the steering axis K. Alternatively, in a modification, not shown, the three power line connection portions 91 may be disposed closer to the rear of the vehicle than the axis O is, and the clamp member 94 may be disposed closer to the front of the vehicle than the axis O is. In any case, the in-wheel motor drive device-side regions 93d need only be disposed so as to overlap the vehicle body-side regions 93f in the longitudinal direction of the vehicle when the vehicle is moving straight.

The in-wheel motor drive device-side regions 93d are disposed at a relatively outer position in the lateral direction of the vehicle, and the vehicle body-side regions 93f are disposed at a relatively inner position in the lateral direction of the vehicle. The intermediate regions 83e thus extend in the lateral direction of the vehicle. Each intermediate region 93e is suspended on its both sides by the in-wheel motor drive device-side region 93d and the vehicle body-side region 93f. The intermediate regions 93e are not held by a clamp member and are suspended in the air.

The power line connection portions of the first embodiment will be described.

Figure 10:
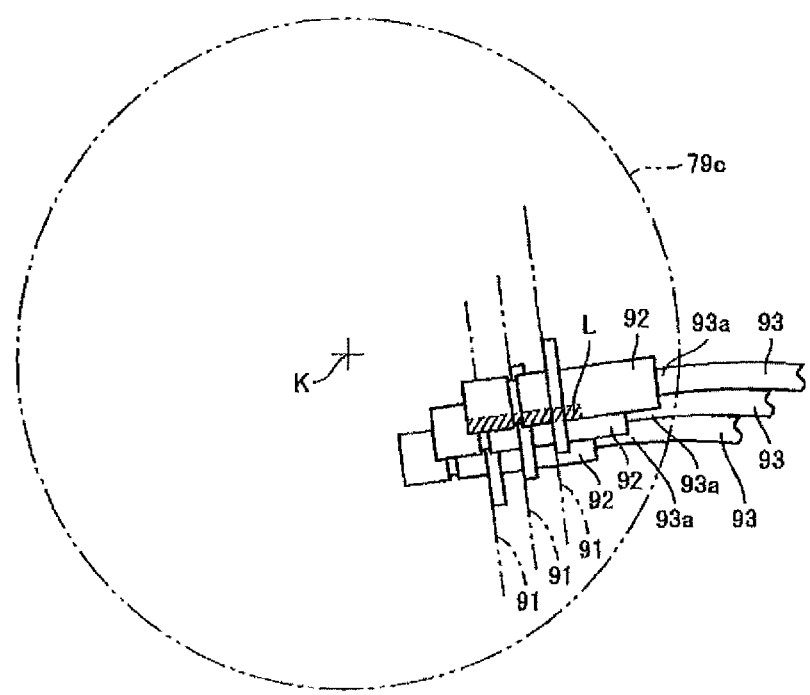
FIG. 10 is a schematic view showing only the power lines and sleeves of the in-wheel motor drive device as viewed from above in the direction of the steering axis.

FIG. 10 is a schematic view showing only the power lines and the sleeves of the in-wheel motor drive device as viewed from above in the direction of the steering axis K. For simplicity of the figure, the power line connection portions 91 are shown in phantom in FIG. 10. The sleeves 92 have the same size and shape and are disposed so as to partially overlap each other in the direction of the steering axis K. All of the three sleeves 92 overlap each other in the same overlap region L. Alternatively, although not shown in the figure, the sleeves 92 may be disposed so as to entirely overlap each other.

Figure 11:
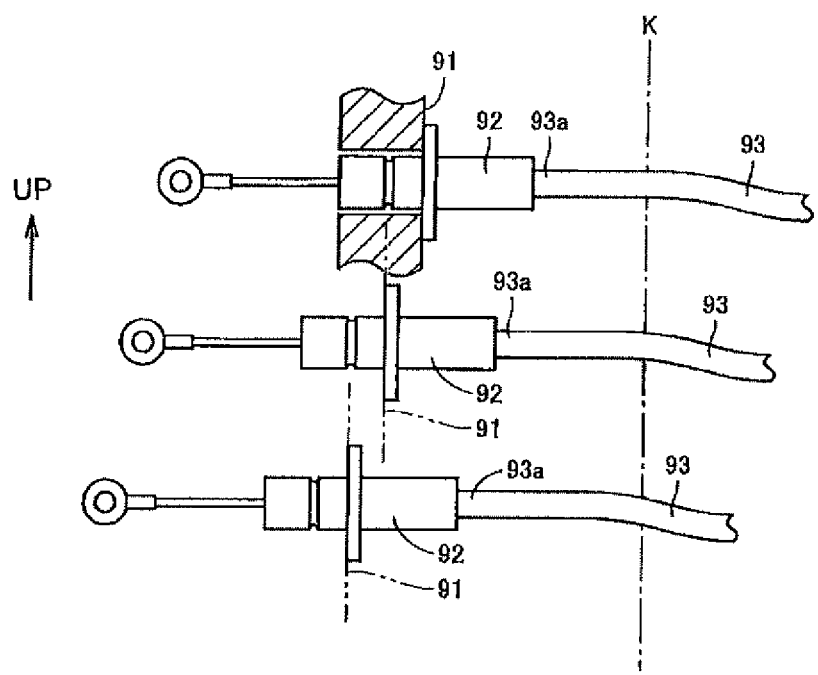
FIG. 11 is a schematic view showing only the power lines and the sleeves of the in-wheel motor drive device as viewed in the lateral direction of the vehicle.

FIG. 11 is a schematic view showing only the power lines and the sleeves of the in-wheel motor drive device as viewed in the lateral direction of the vehicle, and corresponds to FIG. 10. For simplicity of the figure, only one of the power line connection portions 91 is shown by solid line and the other power line connection portions 91 are shown in phantom in FIG. 11. According to the present embodiment, as shown in FIGS. 10 and 11, the distance from the steering axis K to each sleeve 92 is substantially the same. Steering stress that is applied to each power line 93 can therefore be made substantially the same.

According to the first embodiment, the power line 93 includes the in-wheel motor drive device-side region 93d extending in the vertical direction along the steering axis K. This configuration allows the power lines 93 to be disposed closer to the steering axis K. Accordingly, the power lines 93 are not repeatedly bent and extended even when the in-wheel motor drive device 10 is steered together with the wheel. Bending fatigue therefore does not accumulate in the power lines 93, and the life of the power lines 93 can be extended.

According to the first embodiment, the power line 93 further includes the intermediate region 93e and the vehicle body-side region 93f between the in-wheel motor drive device-side region 93d and the other end (the end on the vehicle body 101 side). The upper side of the in-wheel motor drive device-side region 93d is connected to the in-wheel motor drive device 10 side, and the lower side of the in-wheel motor drive device-side region 93d is connected to the intermediate region 93e. The vehicle body-side region 93f extends in the vertical direction. The lower side of the vehicle body-side region 93f is connected to the intermediate region 93e, and the upper side of the vehicle body-side region 93f is connected to the vehicle body 101 side. The intermediate region 93e is curved with its both sides located at a higher position and its intermediate part located at a lower position. Accordingly, when the in-wheel motor drive device 10 is steered, the power lines 93 are hardly displaced, the curvature of the intermediate regions 93e hardly changes, and the in-wheel motor drive device-side regions 93d are merely twisted. The power lines 93 therefore will not be repeatedly bent and extended, and bending fatigue will not accumulate in the power lines 93. Even if the strut 76 extends and contracts and the in-wheel motor drive device 10 also bounces in the vertical direction, the curvature of the intermediate regions 93e changes only slightly, and the power lines 93 will not be repeatedly bent and extended. The closer the in-wheel motor drive device-side regions 93d are to the steering axis K, the more the twisting of the in-wheel motor drive device-side regions 93d can be reduced. The twisting of the in-wheel motor drive device-side regions 93d can be substantially eliminated particularly in the case where the steering axis K crosses at least one of the plurality of in-wheel motor drive device-side regions 93d.

According to these embodiments, the vehicle body-side regions extend in the vertical direction, and the upper or lower sides of the vehicle body-side regions are connected to the vehicle body side. This configuration allows the power lines to be placed such that a part of each power line bypasses the wheel well of the vehicle body, such as, e.g., placing the power lines such that the vehicle body-side regions extend along the back surface (the surface facing toward the inside of the vehicle body) of the wheel well partition wall that separates the wheel well from the internal space of the vehicle. Accordingly, there is no need to form a through hole in the wheel well partition wall and pass the power lines through the through hole, and there is also no need to increase the size of the wheel well. Accordingly, rigidity and strength of the wheel well will not be reduced, and the internal space of the vehicle body will not be sacrificed.

Accordingly, when the in-wheel motor drive device 10 is steered, the power lines 93 are hardly displaced, the curvature of the intermediate regions 93e hardly changes, and the in-wheel motor drive device-side regions 93d are merely twisted. The power lines 93 therefore will not be repeatedly bent and extended, and bending fatigue will not accumulate in the power lines 93. Even if the strut 76 extends and contracts and the in-wheel motor drive device 10 also bounces in the vertical direction, the curvature of the intermediate regions 93e changes only slightly, and the power lines 93 will not be repeatedly bent and extended.

According to the first embodiment, the vehicle body-side regions 93f extend in the vertical direction and the upper sides of the vehicle body-side regions 93f are connected to the vehicle body 101 side. This configuration allows the power lines 93 to be disposed so as to bypass the wheel well 102. Accordingly, there is no need to form a through hole in the partition wall of the wheel well 102 and pass the power lines through the through hole, and rigidity and strength of the wheel well 102 will therefore not be reduced. The above configuration also allows the partition wall of the wheel well 102 to be placed at an outer position in the lateral direction of the vehicle than in conventional examples so that the partition wall of the wheel well 102 can be located closer to the in-wheel motor drive device 10. Accordingly, the size of the wheel well 102 can be reduced and the size of the internal space of the vehicle can be increased as compared to the conventional examples.

According to the first embodiment, the one ends of the power lines 93 which extend from the power line connection portions 91 are disposed so as to at least partially overlap each other as viewed in the direction of the steering axis K. This configuration allows the one end of every power line 93 to be disposed at substantially the same distance from the steering axis K. Accordingly, steering stress will not concentrate on a specific power line 93, and all of the power lines 93 can have substantially the same length of life.

According to the first embodiment, since at least one of the in-wheel motor drive device-side region 93d, the intermediate region 93e, and the vehicle body-side region 93f is not held by anything, this region can be bent or twisted as necessary. Steering stress therefore will not concentrate on a specific part of this region, and the life of the power lines 93 can be extended.

According to the first embodiment, the power lines 93 are held, at a position located closer to the other side (the vehicle body 101 side) than the vehicle body-side regions 93f are, by the clamp member 94 provided on the vehicle body 101. The vehicle body-side regions 93f can thus be made to extend in the vertical direction.

According to the first embodiment, the intermediate regions 93e extend in the lateral direction of the vehicle. This configuration allows the in-wheel motor drive device-side regions 93d located on the one end side to be separated in the lateral direction of the vehicle from the vehicle body-side regions 93f located on the other end side.

According to the first embodiment, the one end of each power line 93 extending from the power line connection portion 91 is passed through the sleeve 92. Each sleeve 92 together with the one end of the power line 93 is inserted through the through hole of the power line connection portion 91 and is fixed therein to hold the one end of the power line 93 and to seal the annular clearance between the power line 93 and the through hole. The power line terminal box 25b can thus be made watertight. Moreover the sleeves 92 are disposed so as to at least partially overlap each other as viewed in the direction of the steering axis K. This configuration allows the one end of every power line 93 to be disposed at substantially the same distance from the steering axis K. Accordingly, steering stress will not concentrate on a specific power line 93, and the life of each power line 93 can be extended.

According to the first embodiment, the strut 76 includes the coil spring 78 and the pair of coil spring seats 79b, 79c and can extend and contract in the direction of the steering axis K. The one ends of the power lines 93 which are connected to the power line connection portions 91 are disposed so as to overlap the lower coil spring seat 79c as viewed in the direction of the steering axis K. Specifically, as shown in FIG. 8, the one ends 93a of the power lines 93 are included in the projected region 79d of the lower coil spring seat 79c which extends parallel to the steering axis K. As shown in FIG. 10, the one ends of the power lines 93 which are connected to the power line connection portions 91 thus overlap the lower coil spring seat 79c as viewed in the direction of the steering axis K. The one ends 93a of the power lines 93 are disposed near the steering axis K, and the in-wheel motor drive device-side regions 93d are also disposed near the steering axis K, so that the extent to which the in-wheel motor drive device-side regions 93d are twisted when the in-wheel motor drive device 10 is steered can be reduced. The closer the in-wheel motor drive device-side regions 93d are to the steering axis K, the more the extent to which the in-wheel motor drive device-side regions 93d are twisted when the in-wheel motor drive device 10 is steered can be reduced.

Figure 12:
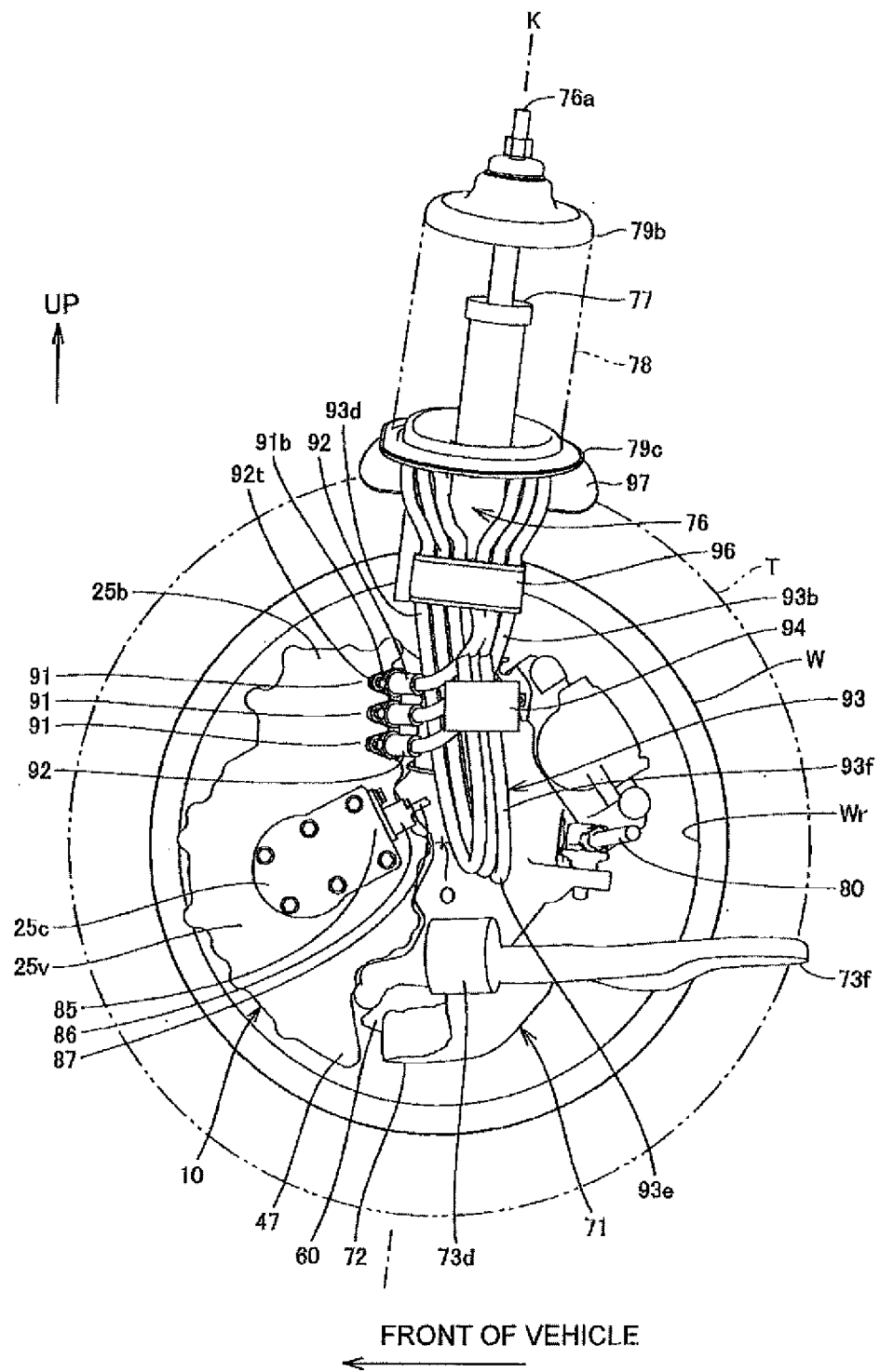
FIG. 12 is a schematic view showing a wiring structure for in-wheel motor power lines according to a second embodiment of the present invention as viewed from inside in the lateral direction of a vehicle.
Figure 13:
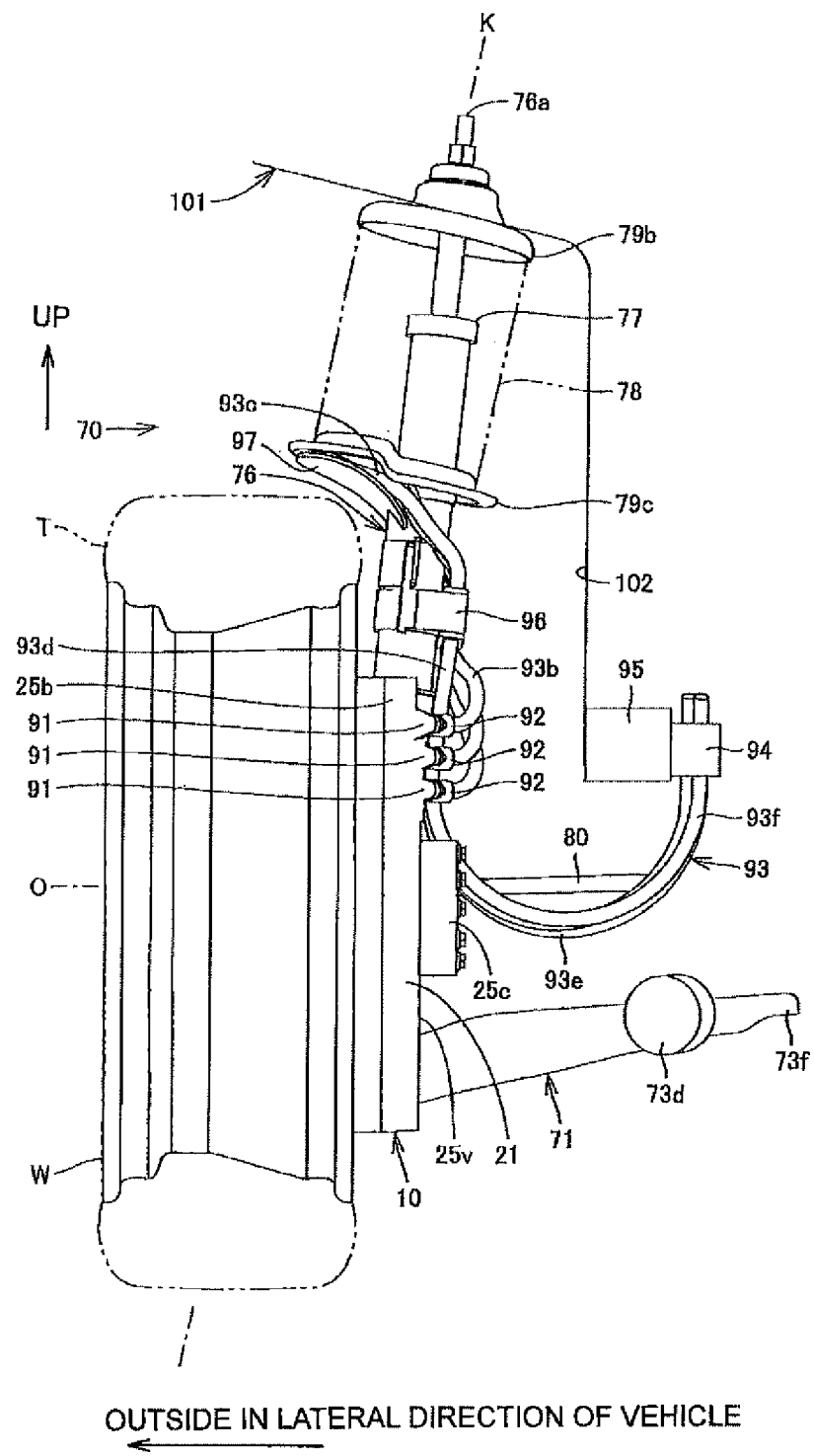
FIG. 13 is a schematic view of the second embodiment as viewed from the front of the vehicle.
Figure 14:
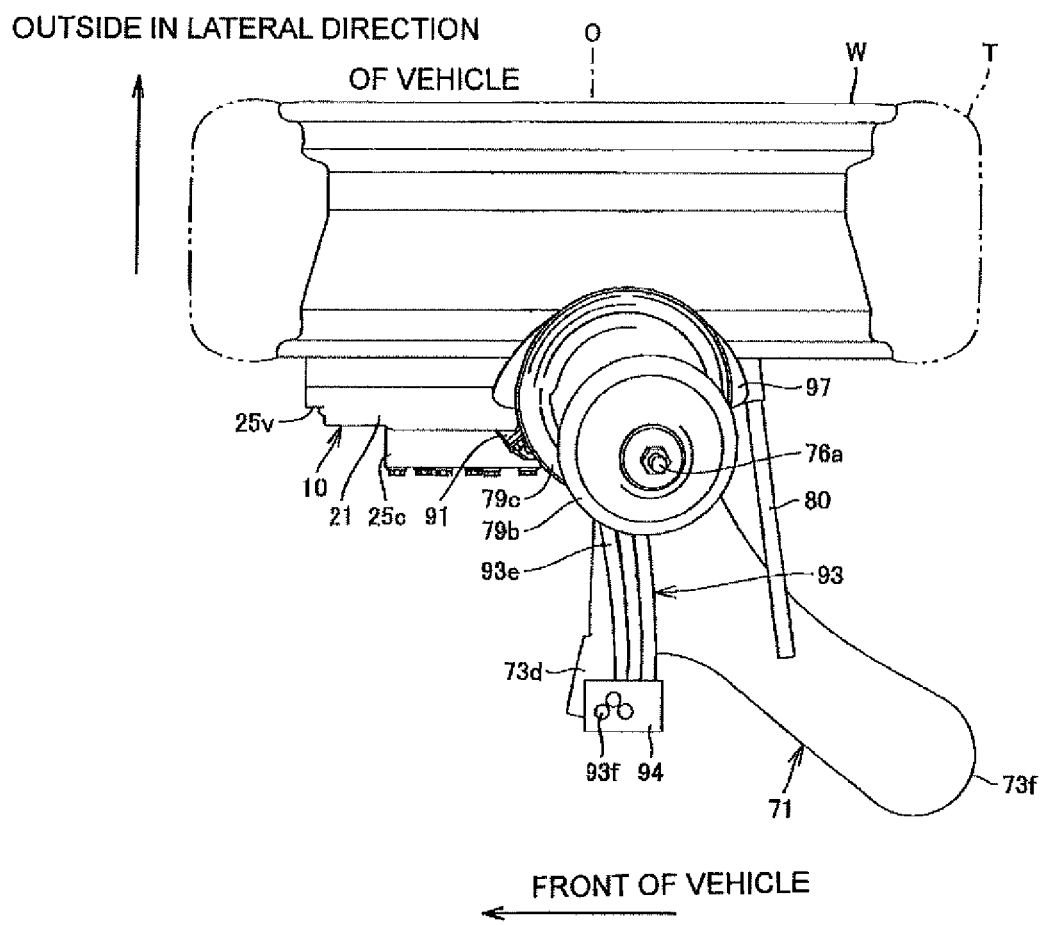
FIG. 14 is a schematic view of the second embodiment as viewed from above the vehicle.

Next, a second embodiment of the present invention will be described. FIG. 12 is a schematic view showing a wiring structure for in-wheel motor power lines according to the second embodiment of the present invention as viewed from inside in the lateral direction of the vehicle. FIG. 13 is a schematic view of the second embodiment as viewed from the front of the vehicle. FIG. 14 is a schematic view of the second embodiment as viewed from above the vehicle. In the second embodiment, the same configurations as those of the above embodiment are denoted with the same reference characters and description thereof will be omitted. Configurations different from those of the above embodiment will be described. In the first embodiment, each power line 93 is connected at its one end to the power line connection portion 91 and extends downward from the one end to form the in-wheel motor drive device-side region 93d. On the other hand, in the second embodiment, as shown in FIGS. 12 and 13, the power lines 93 are placed so as to extend upward from the power line connection portions 91 and to bent in the opposite direction under the lower coil spring seat 79c to extend downward.

Each power line 93 further includes a wheel vicinity region 93b between the one end on the power line connection portion 91 side of the power line 93 and the in-wheel motor drive device-side region 93d. The wheel vicinity region 93b extends in the vertical direction and is placed near the upper part of the tire T. The lower side of the wheel vicinity region 93b is connected to the power line connection portion 91 side, and the upper side of the wheel vicinity region 93 is connected to the in-wheel motor drive device-side region 93d.

A connection portion 93c between the wheel vicinity region 93b and the in-wheel motor drive device-side region 93d is placed around the strut 76 so as to be located next to the lower coil spring seat 79c. The connection point 93c is thus smoothly bent with a radius of curvature larger than the radius of the strut 76.

Clearance between the power lines 93 and the wheel is the smallest in the connection portions 93c. A cover 97 is therefore interposed between the tread of the tire T and the connection portions 93c. The cover 97 is firmly attached to the outer peripheral surface of the strut 76 to support the connection portions 93c from below.

The wheel vicinity regions 93b and the in-wheel motor drive device-side regions 93d extend along the strut 76 and is held by a clamp member 96 that is firmly attached to the outer peripheral surface of the strut 76. Accordingly, at least in the region from the clamp member 96 to the connection portions 93c, the wheel vicinity regions 93b and the in-wheel motor drive device-side regions 93d will not be bent so as to be separated from the strut 76. The clamp member 96 is intended to bundle the plurality of power lines 93 and place them on an inner surface of the strut 76 in the lateral direction of the vehicle, and is not intended to restrict twisting of the power lines 93. Accordingly, in the second embodiment as well, the in-wheel motor drive device-side regions 93d of the power lines 93 can be individually twisted. In the region below the clamp member 96, the in-wheel motor drive device-side regions 93d are placed outward of the wheel vicinity regions 93b in the lateral direction of the vehicle and extend downward beyond the wheel vicinity regions 93b.

According to the second embodiment, each power line 93 further includes the wheel vicinity region 93b between the one end of the power line 93 which is connected to the power line connection portion 91 and the in-wheel motor drive device-side region 93d. The wheel vicinity region 93b extends in the vertical direction, the lower side of the wheel vicinity region 93b is connected to the power line connection portion 91 side, and the upper side of the wheel vicinity region 93b is connected to the in-wheel motor drive device-side region 93d. This configuration allows the in-wheel motor drive device-side regions 93d to have a greater length than in the first embodiment, whereby the extent to which each in-wheel motor drive device-side region 93b is twisted per unit length when the in-wheel motor drive device 10 is steered can be reduced.

According to the second embodiment, the wheel vicinity regions 93b are held by the clamp member 96 provided on the suspension device 70. This configuration allows the wheel vicinity regions 93b to be held so as to extend in the vertical direction.

Figure 15:
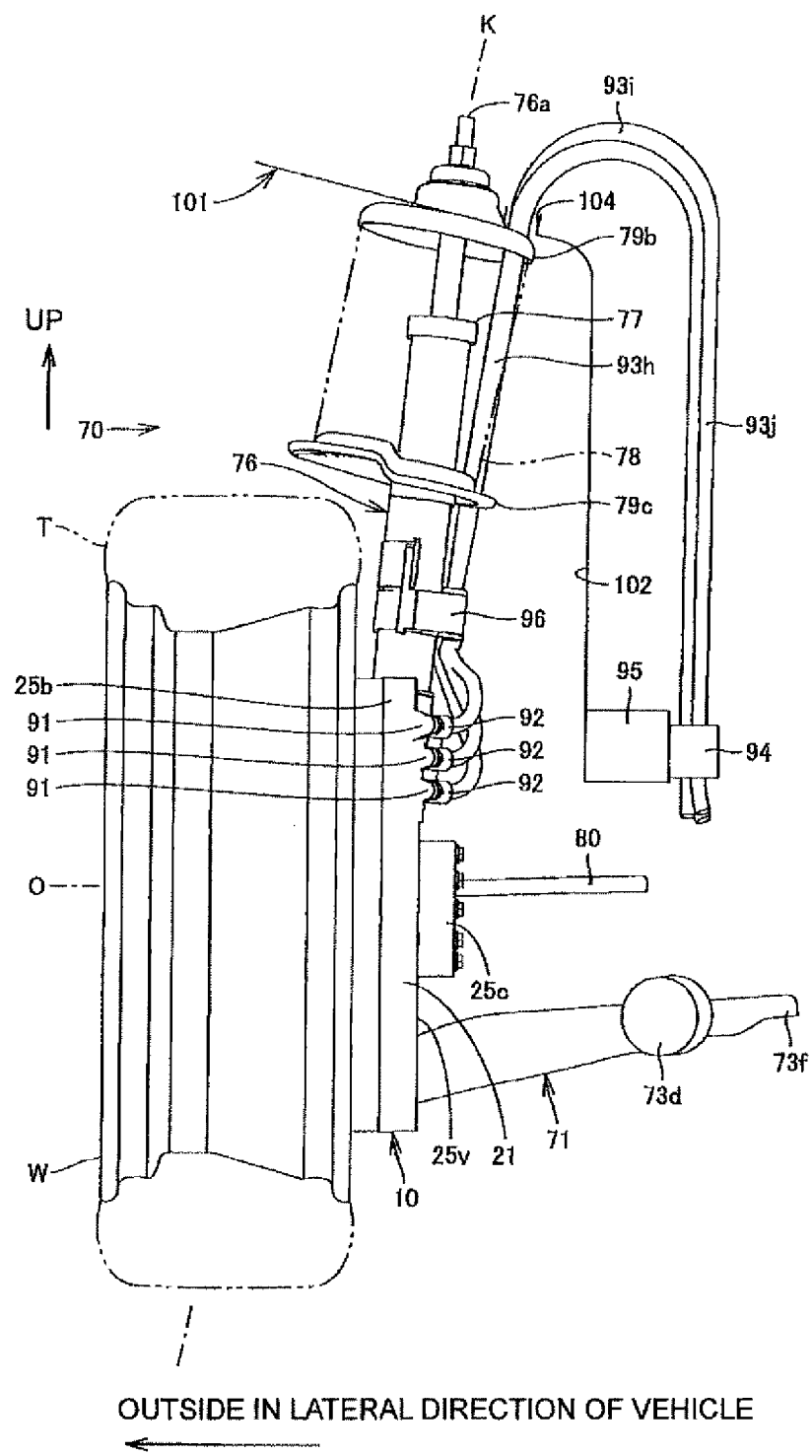
FIG. 15 is a schematic view showing a wiring structure for in-wheel motor power lines according to a third embodiment of the present invention as viewed from the front of a vehicle.

Next, a third embodiment of the present invention will be described. FIG. 15 is a schematic diagram showing a wiring structure for in-wheel motor power lines according to the third embodiment of the present invention as viewed from the front of the vehicle. In the third embodiment, the same configurations as those of the above embodiments are denoted with the same reference characters and description thereof will be omitted. Configurations different from those of the above embodiments will be described. In the third embodiment, the one end of each power line 93 is connected to the power line connection portion 91 of the in-wheel motor drive device 10, and the other end of each power line 93 extends to the wheel body 101. An in-wheel motor drive device-side region 93h, an intermediate region 93i, and a vehicle-side region 93j extend continuously in this order from the one end to the other end of each power line 93.

The three in-wheel motor drive device-side regions 93h extend upward from the power line connection portions 91 and are bundled by the clamp member 96 attached to a lower end region of the strut 76. The in-wheel motor drive device-side regions 93h extend from the clamp member 96 upward along the strut 76, pass by the lower coil spring seat 79c and by the upper coil spring seat 79b, and are passed through a through hole 104 formed in the partition wall of the upper part of the wheel well 102.

The three vehicle body-side regions 93j are disposed in the vehicle body 101 and extend in the vertical direction. The plurality of power lines 93 are bundled by the clamp member 94 at a position located closer to the other ends of the power lines 93 than the vehicle body-side regions 93j are, and are thus held by the clamp member 94 so as to extend in the vertical direction. The vehicle body-side regions 93j are therefore not held by a clamp member and are suspended in the air. The vehicle body-side regions 93j are located above the clamp member 94 and extend in the vertical direction.

The three intermediate regions 93i are located above the upper coil spring seat 79b. The three intermediate regions 93i are disposed in the vehicle body 101 and extend in the lateral direction of the vehicle. More specifically, each intermediate region 93i is curved with its both sides located at a lower position and its intermediate part located at a higher position. The plurality of intermediate regions 93i are not held by a clamp member and are suspended in the air above the through hole 104.

Accordingly, the set of the in-wheel motor drive device-side region 93h, the intermediate region 93i, and the vehicle body-side region 93j is thus held by the strut 76 and the vehicle body 101 so as to be curved in an inverted U-shape with its upper side closed and its lower side open.

According to the third embodiment, each power line 93 further includes the intermediate region 93i and the vehicle body-side region 93j between the in-wheel motor drive device-side region 93h and the other side of the power line 93 which is the vehicle body 101 side. The lower side of the in-wheel motor drive device-side region 93h is connected to the in-wheel motor drive device 10 side, and the upper side of the in-wheel motor drive device-side region 93h is connected to the intermediate region 93i. The vehicle body-side region 93j extends in the vertical direction. The upper side of the vehicle body-side region 93j is connected to the intermediate region 93i, and the lower side of the vehicle body-side region 93j is connected to the vehicle body 101 side. The intermediate region 93i is curved with its both sides located at a lower position and its intermediate part located at a higher position. According to the present embodiment, curvature of the intermediate regions 93i hardly changes even if the in-wheel motor drive device 10 is steered.

According to the third embodiment, the vehicle body-side regions 93j extend in the vertical direction, and the lower side of each vehicle body-side region 93j is connected to the vehicle body 101 side. This configuration allows the power lines to be placed such that a part of each power line bypasses the wheel well of the vehicle body, such as, e.g., placing the power lines such that the vehicle body-side regions 93j extend along the back surface (the surface facing toward the inside of the vehicle body) of the wheel well partition wall that separates the wheel well 102 from the internal space of the vehicle. Accordingly, the wheel well partition wall can be placed at an outer position in the lateral direction of the vehicle than in the conventional examples, and the size of the wheel well 102 can be reduced.

Although the embodiments of the present invention are described above with reference to the figures, the present invention is not limited to the illustrated embodiments. Various changes and modifications can be made to the illustrated embodiments without departing from the spirit and scope of the invention.

INDUSTRIAL APPLICABILITY

The in-wheel motor drive device of the present invention is advantageously used in electric and hybrid vehicles.

REFERENCE SIGNS LIST

10: In-Wheel Motor Drive Device, 11: Wheel Hub Bearing Unit, 12: Outer Ring, 15: Fixed Shaft, 18 Carrier, 21: Motor Unit, 22 Motor Rotary Shaft; 23: Rotor, 24: Stator, 25: Motor Casing, 25b: Power Line Terminal Box, 25c: Signal Line Terminal Box, 25v: Motor Casing Cover, 31: Speed Reduction Unit, 43: Body Casing, 43b: Back Part, 43c: Portion Located Directly Below Axis O, 43f Front Part, 47: Oil Tank, 60: Ball Joint, 70: Suspension Device, 71: Lower Arm, 72: Lateral Outer End, 73, 73d, 73f Lateral Inner End, 77: Shock Absorber, 78: Coil Spring, 79b, 79c: Coil Spring Seat, 80: Tie Rod, 91: Power Line Connection Portion, 91b: Bolt, 93: Power Line, 93b: Wheel Vicinity Region, 93c: Connection Portion, 93d, 93h: In-Wheel Motor Drive Device-Side Region, 93e, 93i: Intermediate Region, 93f, 93j: Vehicle Body-Side Region, 94, 96: Clamp Member, 95: Bracket, K: Steering Axis.

The invention claimed is:

1. A wiring structure for an in-wheel motor power line, comprising:
an in-wheel motor drive device that drives a wheel;
a suspension device that couples the in-wheel motor drive device to a vehicle body such that the in-wheel motor drive device can be steered about a steering axis extending in a vertical direction; and
a bendable power line that has its one end connected to a power line connection portion provided on the in-wheel motor drive device and the other end extending to the vehicle body and that supplies electric power from the vehicle body to the in-wheel motor drive device, wherein
the power line includes, between the one end and the other end, an in-wheel motor drive device-side region extending in the vertical direction along the steering axis and further includes,
an intermediate region and a vehicle body-side region between the in-wheel motor drive device-side region and the other end,
an upper side of the in-wheel motor drive device-side region is connected to the in-wheel motor drive device side, and a lower side of the in wheel motor drive device-side region is connected to the intermediate region,
the vehicle body-side region extends in the vertical direction, a lower side of the vehicle body-side region is connected to the intermediate region, and an upper side of the vehicle body-side region connected to the vehicle body side, and the intermediate region is curved with its both sides located at a higher position and its intermediate part located at a lower position.

2. The wiring structure for the in-wheel motor power line according to claim 1, wherein
the power line further includes an intermediate region and a vehicle body-side region between the in-wheel motor drive device-side region and the other end,
a lower side of the in-wheel motor drive device-side region is connected to the in-wheel motor drive device side, and an upper side of the in-wheel motor drive device-side region is connected to the intermediate region,
the vehicle body-side region extends in the vertical direction, an upper side of the vehicle body-side region is connected to the intermediate region, and a lower side of the vehicle body-side region is connected to the vehicle body side, and
the intermediate region is curved with its both sides located at a lower position and its intermediate part located at a higher position.

3. The wiring structure for the in-wheel motor power line according to claim 1, comprising:
a plurality of the power lines, wherein
the one ends of the power lines which are connected to the power line connection portions are disposed so as to at least partially overlap each other as viewed in a direction of the steering axis.

4. The wiring structure for the in-wheel motor power line according to claim 3, wherein
the suspension device includes a strut coupled to an upper part of the in-wheel motor drive device and a lower arm coupled to a lower part of the in-wheel motor drive device,
the strut includes a coil spring and a pair of coil spring seats that are disposed on upper and lower ends of the coil spring to hold the coil spring therebetween, and is capable of extending and contracting in the direction of the steering axis, and
the one ends of the power lines which are connected to the power line connection portions are disposed so as to overlap the coil spring seat as viewed in the direction of the steering axis.

5. The wiring structure for the in-wheel motor power line according to claim 1, wherein
the power line further includes a wheel vicinity region between the one end and the in-wheel motor drive device-side region, and
the wheel vicinity region extends in the vertical direction, and a lower side of the wheel vicinity region is connected to the power line connection portion side, and an upper side of the wheel vicinity region is connected to the in-wheel motor drive device-side region.

6. The wiring structure for the in-wheel motor power line according to claim 5, wherein
the wheel vicinity region is held by a clamp member provided on the suspension device.

7. The wiring structure for the in-wheel motor power line according to claim 1, wherein at least one of the in-wheel motor drive device-side region, the intermediate region, and the vehicle body-side region is not held by anything.

8. The wiring structure for the in-wheel motor power line according to claim 1, wherein
the power line is held, at a position located closer to the other side than the vehicle body-side region is, by a clamp member provided on the vehicle body.

9. The wiring structure for the in-wheel motor power line according to claim 1, wherein
the intermediate region extends in a lateral direction of a vehicle.

10. The wiring structure for the in-wheel motor power line according to claim 1, wherein
the one end of the power line which extends from the power line connection portion is passed through a sleeve, and
each of the sleeves together with the one end of the power line is inserted through a through hole of the power line connection portion and is fixed therein to hold the one end of the power line and to seal annular clearance between the power line and the through hole, and the sleeves are disposed so as to at least partially overlap each other as viewed in the direction of the steering axis.

11. An in-wheel motor drive device, comprising:
a hub ring that is coupled to a wheel;
a motor unit having a motor rotary shaft that drives the hub ring, a motor casing that serves as an outer shell, and a power line connection portion provided on the motor casing; and
a bendable power line that has its one end connected to the power line connection portion and the other end extending to a vehicle body located outside the motor casing, and that supplies electric power from the vehicle body to the motor unit, wherein
the in-wheel motor drive device is coupled to the vehicle body such that the in-wheel motor drive device can be steered about a steering axis extending in a vertical direction,
the power line includes, between the one end and the other end, an in-wheel motor drive device-side region, an intermediate region, and a vehicle body-side region which extend continuously,
the in-wheel motor drive device-side region extends in the vertical direction and along the steering axis, an upper side of the in-wheel motor drive device-side region is connected to the power line connection portion side, and a lower side of the in-wheel motor drive device-side region is connected to the intermediate region,
the vehicle body-side region extends in the vertical direction, a lower side of the vehicle body-side region is connected to the intermediate region and an upper side of the vehicle body-side region is connected to the vehicle body side, and
the intermediate region is curved with its both sides located at a higher position and its intermediate part located at a lower position.

\* \* \* \* \*